US012806961B2

(12) United States Patent
Philipps et al.

(10) Patent No.: US 12,806,961 B2
(45) Date of Patent: Nov. 24, 2026

(54) HVAC AIR INLET SYSTEM

(71) Applicant: MAHLE INTERNATIONAL GMBH, Stuttgart (DE)

(72) Inventors: Ryan Philipps, Kenmore, NY (US); George Melero, Buffalo, NY (US); Randy Wiler, Kendall, NY (US); James Salmeri, Tonawanda, NY (US); Matthew Kiss, Williamsville, NY (US)

(73) Assignee: MAHLE International GmbH, Stuttgart (DE)

( * ) Notice: Subject to any disclaimer, the term of this patent is extended or adjusted under 35 U.S.C. 154(b) by 278 days.

(21) Appl. No.: 18/926,076

(22) Filed: Oct. 24, 2024

(65) Prior Publication Data

US 2025/0353353 A1 Nov. 20, 2025

Related U.S. Application Data

(60) Provisional application No. 63/647,726, filed on May 15, 2024.

(51) Int. Cl.
*B60H 1/00* (2006.01)

(52) U.S. Cl.
CPC ..... *B60H 1/00849* (2013.01); *B60H 1/00028* (2013.01); *B60H 1/00064* (2013.01)

(58) Field of Classification Search
CPC ............ B60H 1/00849; B60H 1/00471; B60H 1/00064; B60H 1/00028; B60H 1/00678
See application file for complete search history.

(56) References Cited

U.S. PATENT DOCUMENTS

| | | | | |
|---|---|---|---|---|
| 8,425,284 | B2 | 4/2013 | MacDonald et al. | |
| 9,643,472 | B2 | 5/2017 | Sakamoto et al. | |
| 11,458,806 | B2 | 10/2022 | Haupt et al. | |
| 2012/0214394 | A1* | 8/2012 | Kanemaru | B60H 1/00678 454/139 |
| 2018/0072131 | A1* | 3/2018 | Lee | B60S 1/54 |
| 2023/0286352 | A1 | 9/2023 | Haupt et al. | |
| 2025/0319744 | A1* | 10/2025 | Wolfe, IV | B60H 1/00021 |

FOREIGN PATENT DOCUMENTS

| | | |
|---|---|---|
| DE | 102005023471 | 12/2005 |
| DE | 102021128481 | 5/2023 |

OTHER PUBLICATIONS

Examination Regort dated Jan. 13, 2026, DE 102025118428.3 (12 pages).

* cited by examiner

*Primary Examiner* — Syed O Hasan
(74) *Attorney, Agent, or Firm* — Barnes & Thornburg

(57) ABSTRACT

An air intake system for a vehicle HVAC system is provided. The system includes a housing with air inlets and an outlet where air flows to a fan within an HVAC system. The air inlet comprising a first air inlet that is aligned to allow air to flow therethrough and into the inner volume from a passenger compartment of a vehicle and a second air inlet that is configured to allow air to flow into the inner volume from outside of a vehicle. A valve with a blocking surface that is movable with respect to the housing to allow or block air flow through a recirculating air inlet. The blocking surface receives torque from an input that is disposed radially outboard of the blocking surface.

19 Claims, 22 Drawing Sheets

| Average Measured Sound Pressure Level – from Chart of FIG. 19 Across The Measured Frequency Range (dBa) | | | | | |
|---|---|---|---|---|---|
| Type of Air Inlet | Measured Airflow (cfm – cubic feet / minute) | Outside Air (OSA) Intake Only | Recirc Air Only | OSA level – Recirc Air level (positive – OSA less than Recirc, negative OSA greater than Recirc) | |
| | A | B | C | D | |
| Conventional Air Inlet Housing – Top and Side Air Inlet (FIG. 21) | 145 | 33.5 | 34.6 | 1.0 | |
| | 235 | 45.7 | 45.6 | -0.1 | |
| | 325 | 53.9 | 53.8 | -0.1 | |
| | 420 | 60.7 | 61.2 | 0.5 | |
| Air Inlet Housing - Limited Top Air Inlet and Side Air Inlets (FIGs. 9-14) | 145 | 33.4 | 34.1 | 0.7 | |
| | 235 | 45.6 | 44.6 | -1.0 | 4001 |
| | 325 | 54.2 | 52.9 | -1.3 | 4002 |
| | 420 | 60.6 | 59.6 | -1.0 | 4003 |
| Air Inlet Housing - Side Air Inlets Only (FIGs. 1-8) | 145 | 33.5 | 33.9 | 0.4 | |
| | 235 | 46.3 | 44.8 | -1.5 | 4004 |
| | 325 | 54.0 | 52.7 | -1.3 | 4005 |
| | 420 | 60.9 | 59.7 | -1.2 | 4006 |

Measured Sound Pressure Level – Measured from Position of Driver's Right Ear (HVAC System Installed in Vehicle For Driving on Right Side of Road – E.g. United States, Germany)

FIG. 20

| Airflow (cfm) | Conventional Housing (FIG. 21) | Housing 200 (FIGs. 9-14) | Housing 100 (FIGs. 1-9) |
|---|---|---|---|
| 145 | 9 | 9 | 9 |
| 235 | 46 | 34 | 38 |
| 325 | 107 | 93 | 101 |
| 420 | 255 | 204 | 228 |

Power (W) for Fan Operation With Full Recirc Flows

FIG. 22

HVAC AIR INLET SYSTEM

CROSS-REFERENCE TO RELATED APPLICATIONS

This application claims priority from U.S. Provisional Application No. 63/647,726, filed May 15, 2024, the entirety of which is hereby incorporated by reference herein.

BACKGROUND OF THE INVENTION

This application relates to an HVAC system for a vehicle and particularly to an HVAC system for a vehicle that is capable of operating under electrical power.

SUMMARY OF THE INVENTION

A first representative embodiment of the disclosure is provided. The embodiment includes an air intake system for a vehicle HVAC system. The system includes a housing that with an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle. The air outlet allows air from within the inner volume to flow out of the housing and to a fan disposed downstream of the air outlet. A valve that is movable with respect to the housing, the valve can be moved between a first position where air can flow through the first air inlet and into the inner volume and a second position where air is prevented from flowing through the first air inlet and into the inner volume. The valve includes a blocking surface, wherein the blocking surface receives torque from an input that is disposed radially outboard of the blocking surface, wherein the blocking surface is movable between a first position where air is allowed to flow through the first air inlet and a second position where air is prevented from flowing through the first air inlet.

Another representative embodiment of the disclosure is provided. The embodiment is an air intake system for a vehicle HVAC system. The embodiment includes a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle. The air outlet allows air from within the inner volume to flow out of the housing and to a fan disposed downstream of the air outlet. The housing is disposed within the vehicle such that a rear projecting surface faces a first direction toward passenger compartment of the vehicle that receives the HVAC system, and a front projecting surface that faces in second direction that is opposite the first direction, such that the front projecting surfaces faces away from the passenger compartment. The system further includes a valve that is movable with respect to the housing, the valve can be moved between a first position where air can flow through the first air inlet and into the inner volume and a second position where air is prevented from flowing through the first air inlet and into the inner volume. The valve includes a blocking surface, wherein the blocking surface receives torque from an input, wherein the blocking surface is movable between a first position where air is allowed to flow through the first air inlet and a second position where air is prevented from flowing through the first air inlet. The housing wall comprises first and second side walls, the first and second side walls are each planar or substantially planar, the first and second walls are spaced apart, the housing wall further comprises a center wall that extends between the first and second side walls, wherein the first air inlet extends through each of the first and second side walls, and a center portion that extends along the center wall. The center portion of the first air inlet does not face in the first direction.

Further representative embodiments of the disclosure are provided that corresponding with the Numbered Paragraphs, and various combinations of the Numbered Paragraphs, provided at the end of the specification below.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

BRIEF DESCRIPTION OF DRAWINGS

FIG. 20 is a table that provides the average sound pressure level across all frequencies as plotted in FIG. 19.

FIG. 22 is a chart that plots the measured power (in Watts) of the HVAC fan to achieve various airflow levels (in cfm) for the conventional housing (FIG. 21), the housing 100 (FIGS. 1-8), and the housing 200 (FIGS. 9-14).

DETAILED DESCRIPTION OF THE INVENTION

Figure 1:
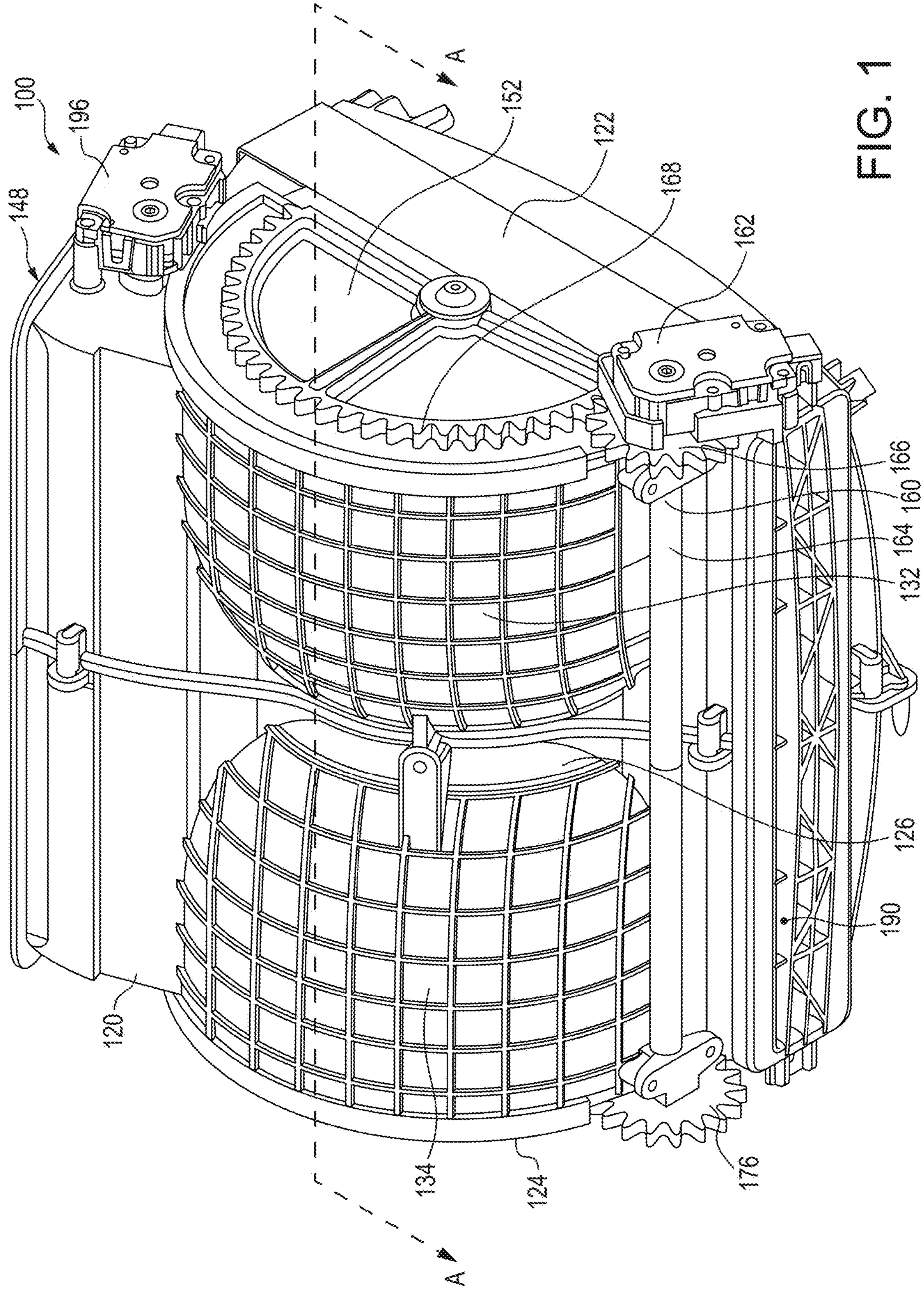
FIG. 1 is perspective view of a first air intake system oriented to block recirculating air flow from a passenger compartment of a vehicle from entering the inner volume of the housing.

Turning now to FIGS. 1-18 an air intake system 100, 200, 300 for a vehicle HVAC system 10 is provided. The air intake system is includes inlets that allow air to flow into the HVAC system from both an outside air source (Y) as well as from air that flows therein from the passenger compartment of the vehicle (W, X, V V) that includes the HVAC system 10 (also referred to herein as recirculating air). The air intake system 100, 200, 300 is provided to receive air therein, which passes to a fan 410 within a fan housing 400. Air that flows out of the discharge of the fan 410 flows to an air conditioning housing 500 where the air is heated or cooled, as desired, and then the air is sent to one or more locations or systems within the vehicle.

The air intake system 100, 200, 300 is configured to be used with a vehicle, such as a passenger vehicle. In some embodiments, the air intake system 100, 200, 300 is particularly suited for electrical vehicles that are powered (both for movement of the vehicle and for the other loads of the vehicle (i.e. climate control, infotainment, window operation, and the like)) from current drawn from a rechargeable battery, or for hybrid vehicles where the vehicle's propulsion can be selectively powered from an internal combustion engine or with electrical power from an on board battery. In other embodiments, the air intake system 100, 200, 300 may be implemented in other vehicles or machines that include passenger compartments, or that use air flow therein for various purposes, particularly for vehicles or machines that can operate with electric power but do not have a constant access to electrical power. For example, the air intake system 100, 200, 300 may be used with the HVAC systems of farm equipment, large trucks (e.g. dump trucks, cement trucks), cranes, material handling equipment, boats, trains, aircraft, or the like. For the sake of brevity this specification is specifically directed to passenger vehicles but the air intake system 100, 200, 300 could be readily adapted for HVAC systems of other vehicles or machines as will be readily understood to those of skill in the art with a thorough review and understanding of this specification and figures.

Figure 15:
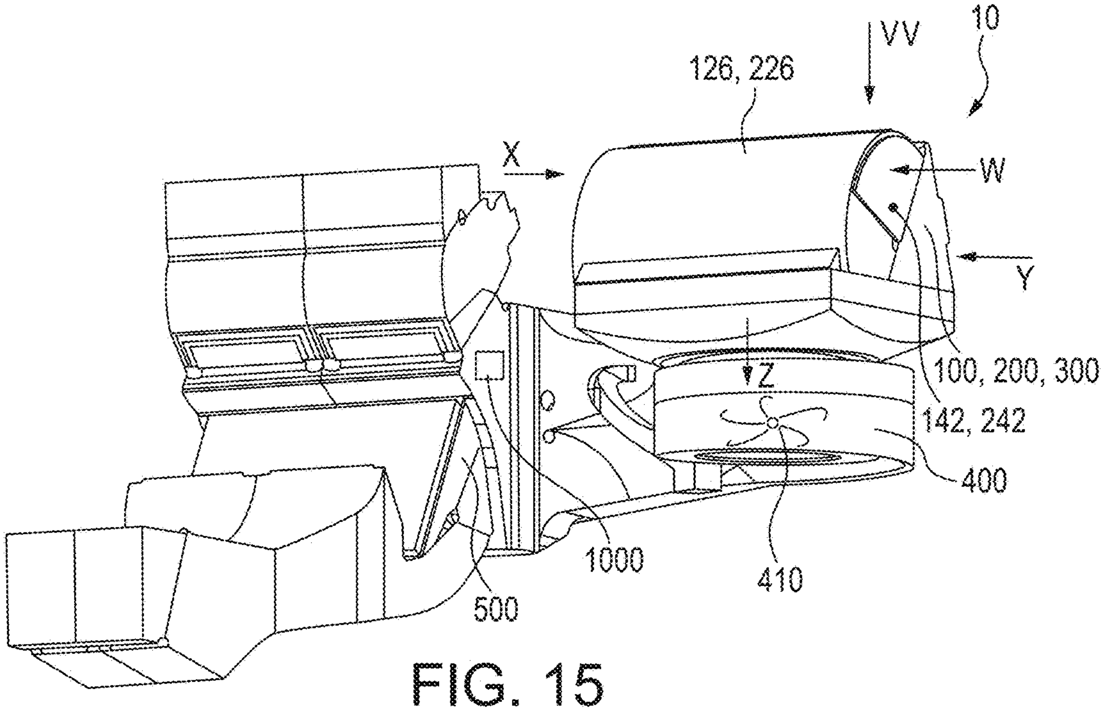
FIG. 15 is a rear perspective view of an HVAC system that receives one of the air intake systems disclosed herein.
Figure 16:
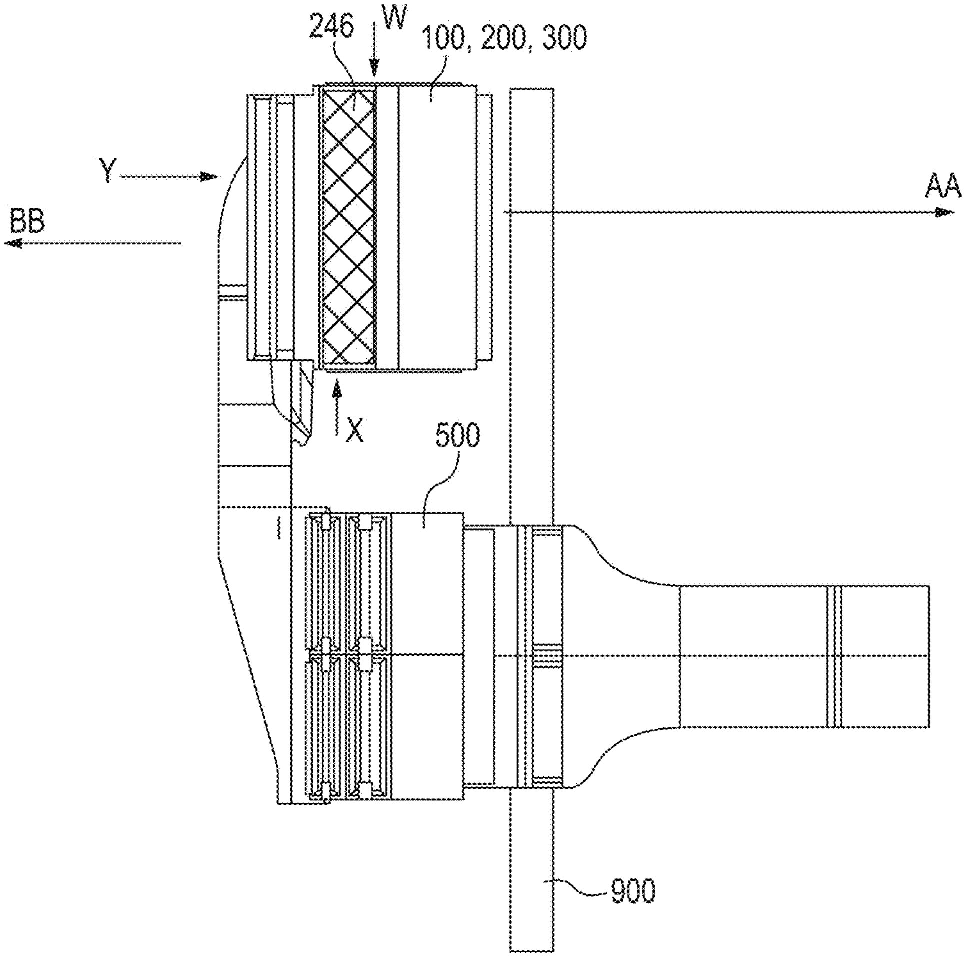
FIG. 16 is a top view of the HVAC system of FIG. 15.

FIGS. 15, 16 schematically depict the air intake system 100, 200, 300 (details of the various systems 100, 200, 300 are depicted in other figures in this application and would be positioned where the air intake system 100, 200, 300 is schematically depicted in the figures). The air intake system 100, 200, 300 is a component of an HVAC system for a vehicle. FIG. 15 is a perspective view that depicts the air intake system 100, 200, 300 disposed above a fan housing 400 that includes a fan 410 (schematic). The fan housing 400 receives air that flows through the air outlet of the air intake system (schematic arrow Z) and toward the suction of the fan 410. Air that is discharged from the fan flows to the air conditioning housing 500 where the air is heated or cooled (typically with a heat pump heater or an evaporator of a heat pump system) and directed to one or more desired locations with the passenger compartment as operated by an HVAC controller 1000 that operates the vehicles air conditioning and heating system as desired by the passengers (via one or more controls located in the passenger compartment) or as programmed to be operated by the HVAC controller 1000. FIG. 16 is a top view of the HVAC system of FIG. 15 and depicts the alignment of the system with respect to the passenger compartment—on opposite side of bulkhead 900, the passenger compartment is behind majority of the vehicle (with respect to the direction of forward motion of the vehicle), with the passenger compartment in the direction AA with respect to the air intake system 100, 200, 300 and the front of the vehicle is in the direction BB with respect to the air intake system 100, 200, 300.

Each of the air intake system 100, 200, 300 discussed herein are configured to accept outside air (Y, schematic) through an outside air inlet 148, 248, and to also accept air that flows thereto from within the passenger compartment (otherwise referred to herein as recirculating air, or recirc. air). The air inlet system 100, 200, 300 have some different air inlets, that allow for air flow W (recirc. air through a right side wall of the housing 122, 222), air flow X (recirc. air through the left side wall of the housing 124, 224), and air flow V V (recirc. air through the center wall of the housing 226). Air that enters the intake housing, flows out an air outlet 129, 229, 329 and flows to the fan housing 400 and the suction of the fan 410. Each air intake housing may receive an air filter 191 through which air flows through the inner volume 121 (flows X2, W2, schematic) and then through the filter before flowing out of the air outlet (flow Z, schematic) and to the fan housing 400 (e.g. FIGS. 7 and 8). The filter 191 may be removable and replaceable through a filter inlet 190. In embodiments, the filter inlet 190 is provided to allow the filter to be replaced from within the passenger compartment—such as through the glove box within the dashboard of the vehicle. In other embodiments (not shown) the filter inlet 190 may be provided within the forward compartment of the vehicle.

The first air intake system 100 is best shown in FIGS. 1-8. The system 100 includes a housing 120 that encloses the components of the system, and includes a first air inlet (142, 144) that receives recirc. air from the passenger compartment of the vehicle, a second air inlet 148 that receives outside air (air flow Y, schematic), and an air outlet 129 that directs air from the housing 120 to the fan housing 300 (FIG. 15).

The housing 120 includes a first side wall 122, and an opposite second side wall 124. In the embodiment depicted in the figures (which is for a vehicle in the United States and other locations where the vehicle drives on the right side of the road) the first side wall 122 faces the right side of the vehicle (when looking at the vehicle from above) which is the side where the front row vehicle passenger sits. In the embodiment depicted in the figures the second side wall 124 faces the left side of the vehicle or the driver's side of the vehicle. One of ordinary skill in the art will readily understand that the first air intake system 100 (and the overall HVAC system 10) can be made with the opposite alignment—i.e. where the vehicle is intended to be driven on the left side of the road (i.e. United Kingdom, Australia, etc.) and the first side wall 122 and the second side walls 124 would be provided on the opposite sides of the housing 120 as depicted in the figures.

The first and second side walls 122, 124 may be parallel to each other, or substantially parallel to each other. In some embodiments, the side walls 122, 124 may be exactly planar, with those walls parallel to each other. In other embodiments, walls may have one or more features or portions that do not lie within a single plane, but the walls may be arranged such that a plane extends through a majority of the wall, or a best fit plane that extends through the wall can be generated. In these embodiments, the plane that extends through the majority of the wall, or the best fit planes may be parallel to each other or substantially parallel to each other. The term "substantially parallel" is defined herein to include exactly parallel as well as orientations where the walls (or planes through the walls) make a small acute angle with respect each other, such as with an angle that is 10 degrees or less.

The housing 120 further includes a center wall 126 that connects the first and second side walls 122, 124, and specifically along a top edge 122*a*, 124*a* of the respective first and second wall 122, 124. The center wall 126 extends between the first and second walls 122, 124 and encloses the inner volume 121 of the housing (in combination with the first and second walls 122, 124 and the bottom wall 129 discussed below).

The bottom wall 129 forms the bottom of the housing 129 and extends inwardly from the center wall 126 and the first and second side walls 122, 124. The bottom wall includes an air outlet hole 129*a* through which air flows (Z, schematic) to the fan housing 400. The bottom wall 129 may be gradually curved to transition from the size of the inner volume 121 to the size of the outlet hole 129*a* to aid in smooth (laminar) air flow through the air inlet housing 120.

The center wall 126 extends to form the front end (facing direction BB) and the rear end (facing direction AA) of the housing 120. The front projecting surface 123*b* faces the front end of the vehicle and the rear projecting surface 123*a* faces the passenger compartment of the vehicle.

The front projecting surface 123*b* includes the outside air inlet 148, that is configured to receive air from outside of the vehicle. The outside air inlet 148 allows air to flow into the inner volume 121 and ultimately to the air outlet aperture 129*a*. In the embodiments depicted in the figures, the outside air inlet 148 may include an isolation valve 197 that can be positioned in a position to block air to pass through the outside air inlet 148 (as depicted in the figures) and can be positioned in an open position to allow air to pass through the outside air inlet 148 and into the inner volume 121 of the housing 120. The isolation valve 197 is moved with an operator 196 that rotates the valve between the blocking and open positions. In some embodiments, the operator 196 can move the valve 187 to an intermediate (or throttling) position to allow some air to pass though the outside air inlet 148, but less air than when the valve 197 is fully open. The operator 196 may be controlled by the HVAC controller 1000, to switch from open and blocking positions based upon the desired HVAC operation by the vehicle passengers and in some embodiments with automatic or feedback control based upon monitored parameters—e.g. outside temperature, passenger compartment temperature, outside and passenger compartment humidity, vehicle speed, and the like. In some embodiments, the HVAC controller 1000 may cause the valve 197 to be in a throttled position when the vehicle speed is over a certain speed, to minimize outside air intake into the housing 120, with the cross-sectional opening through the outside air inlet 148 needing to be reduced due to the relatively high outside air velocity reaching the inlet 148 due to the high speed of the vehicle. The term "block" air flow as used herein (as well as the term "prevent air flow") means preventing all flow through the respective aperture, as well as preventing all flow though the aperture other than a di minimus amount of flow through the aperture that is due to improper seating of a blocking component (valve, blocking surface) with respect to the sides of the aperture, tolerance stacking of components, or wear of components through use.

In the system 100, the first side wall 122 includes a first air inlet 142 and the second side wall 124 includes a second air inlet 144, with each of the air inlets 142, 144 when exposed allowing air flow into the inner volume 121 (see schematic air flows W and X). In this embodiment, the center wall 126 does not have an air inlet.

Figure 2:
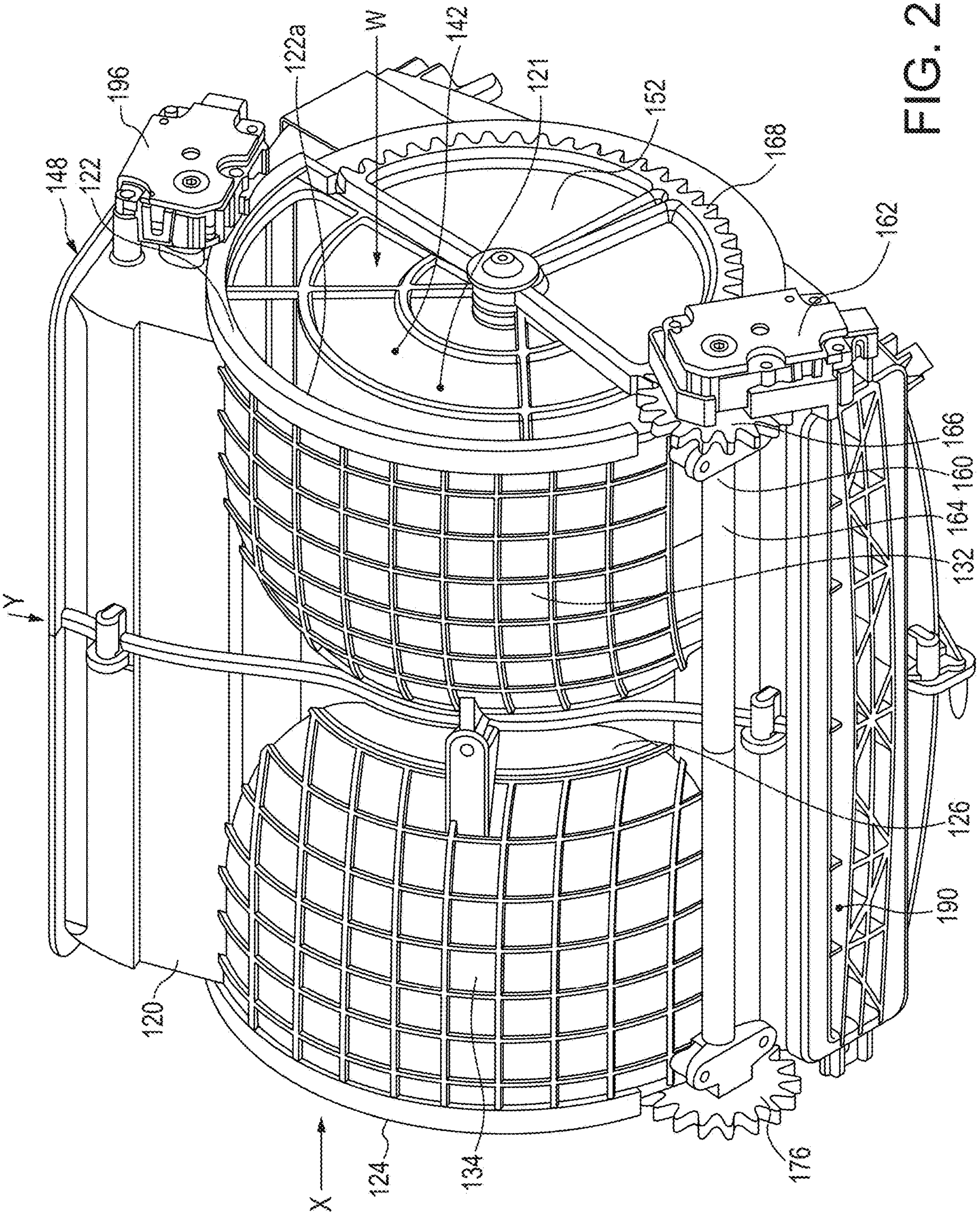
FIG. 2 is the view of FIG. 1 with the system oriented to allow recirculating air to flow from the passenger compartment of the vehicle and into the inner volume of the housing.
Figure 3:
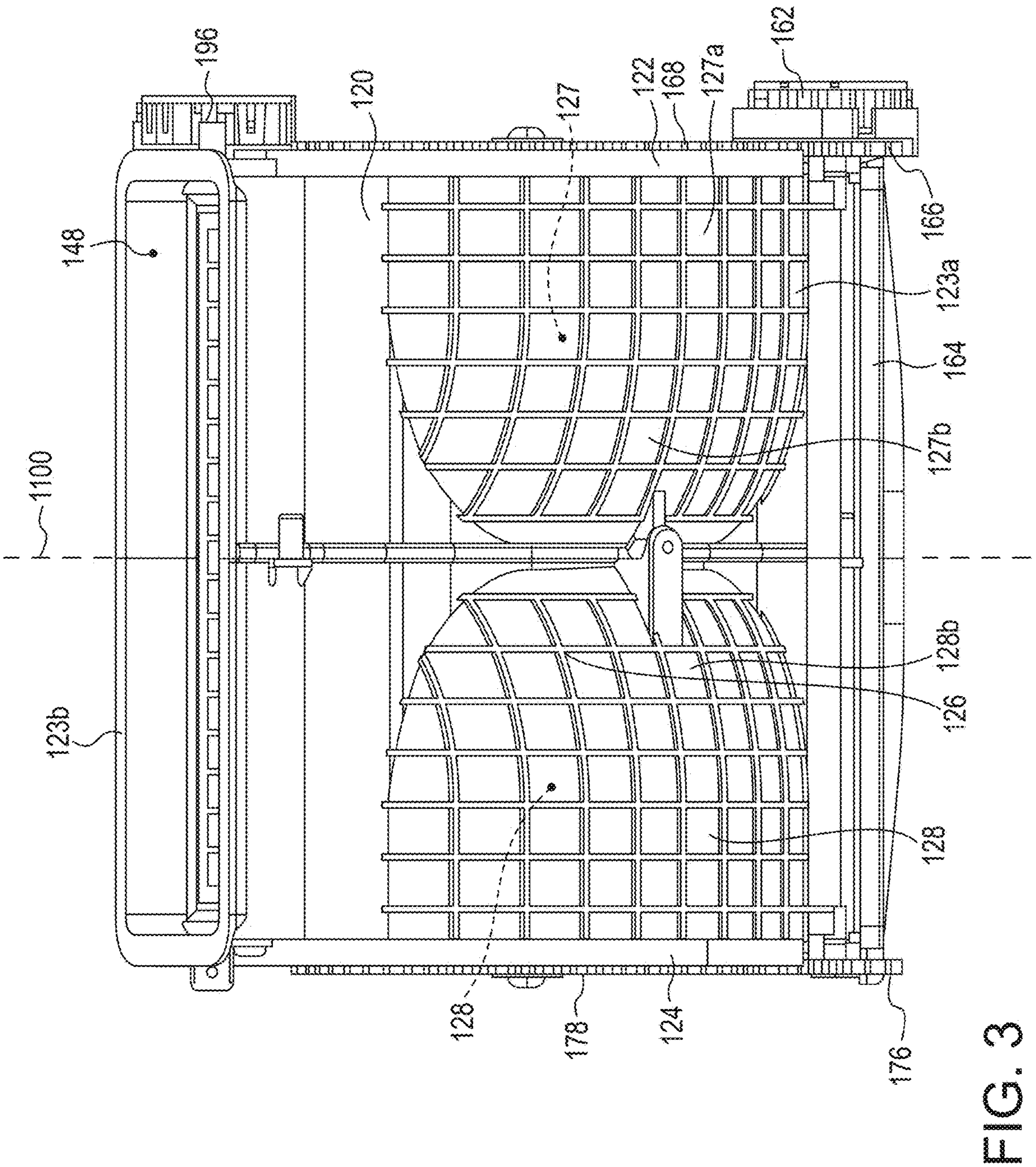
FIG. 3 is a top view of the air intake system of FIG. 1.
Figure 4:
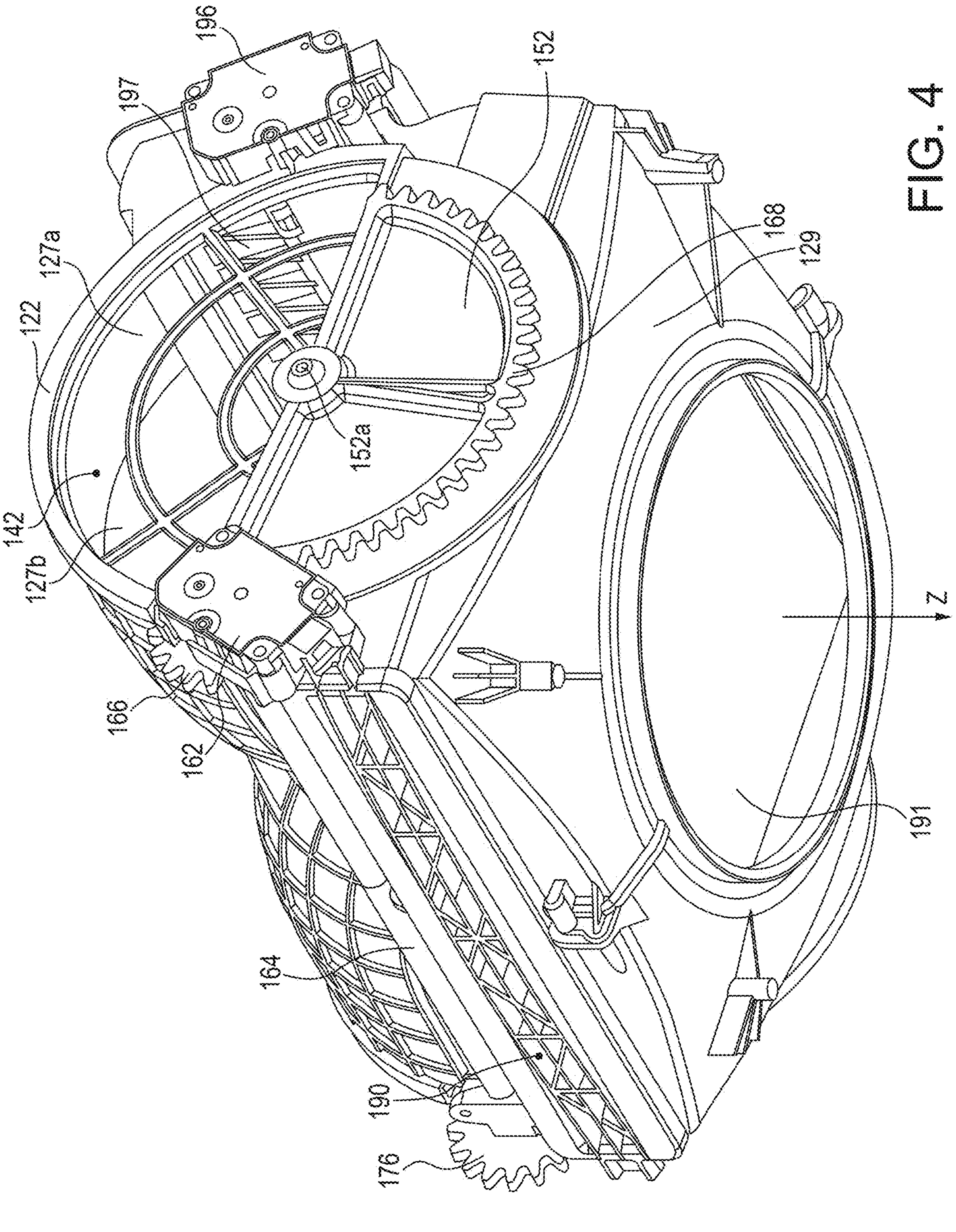
FIG. 4 is a bottom perspective view of the air intake system of FIG. 1.
Figure 5:
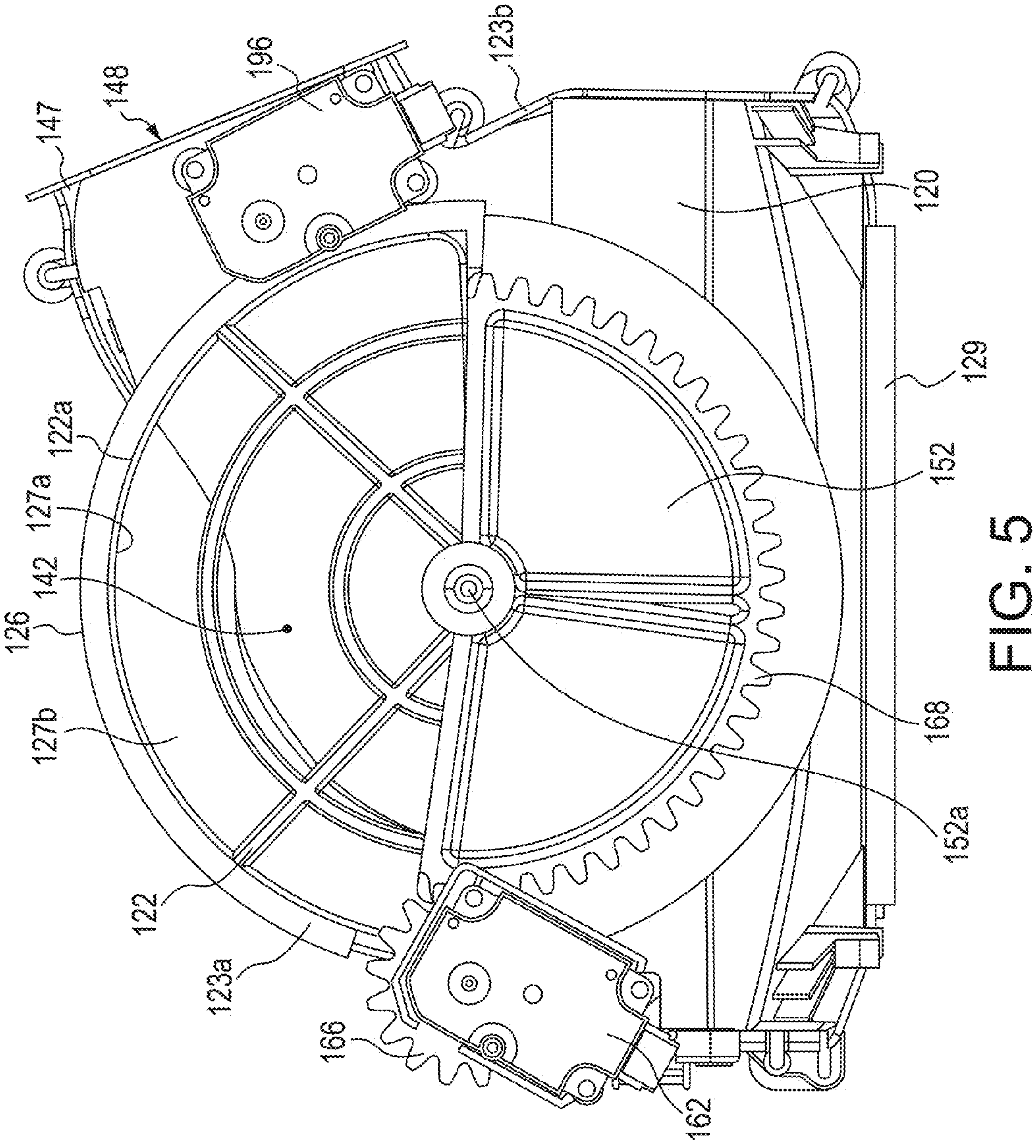
FIG. 5 is right side view of the air intake system of FIG. 1.
Figure 6:
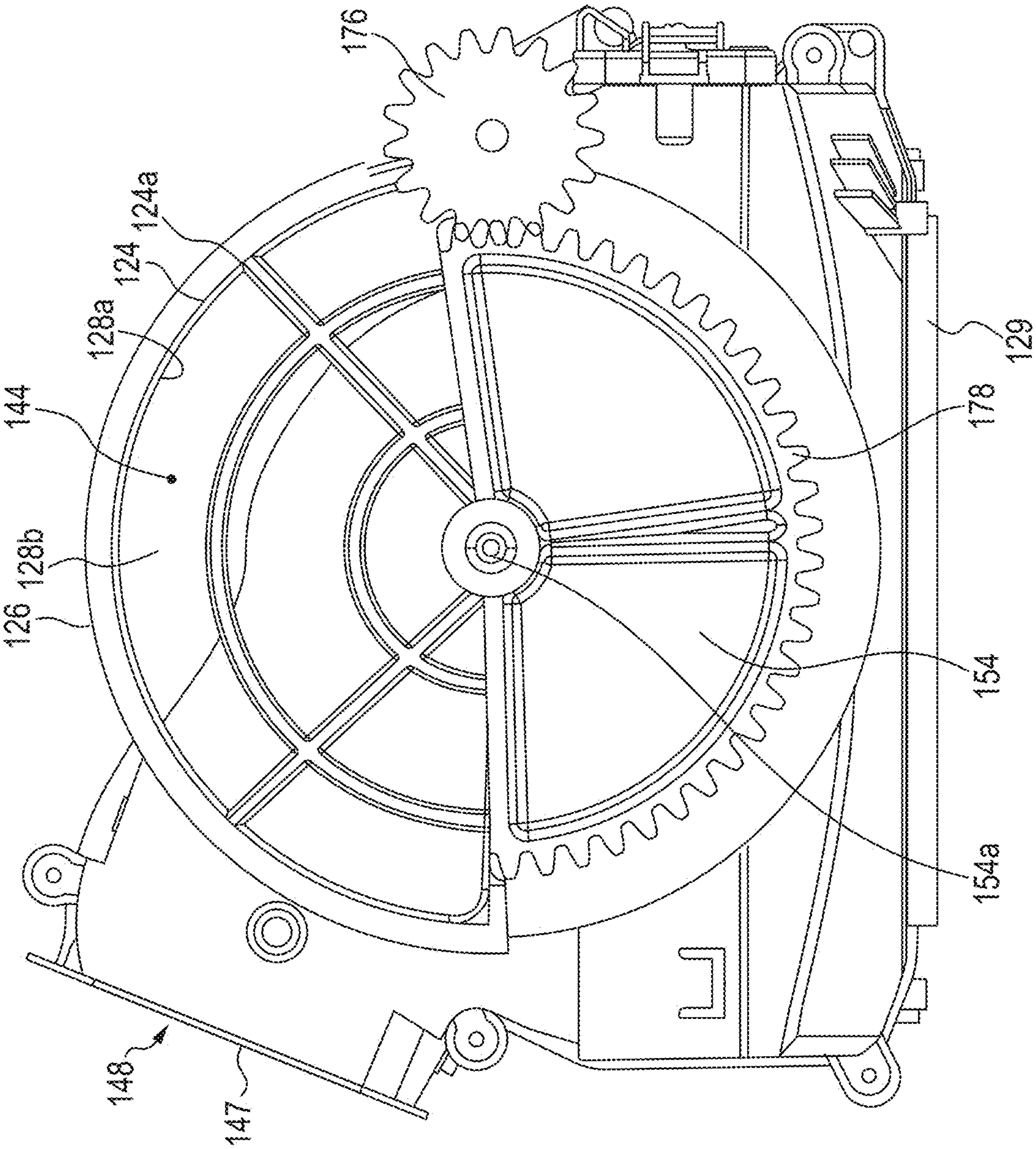
FIG. 6 is a left side view of the air intake system of FIG. 1.
Figure 7:
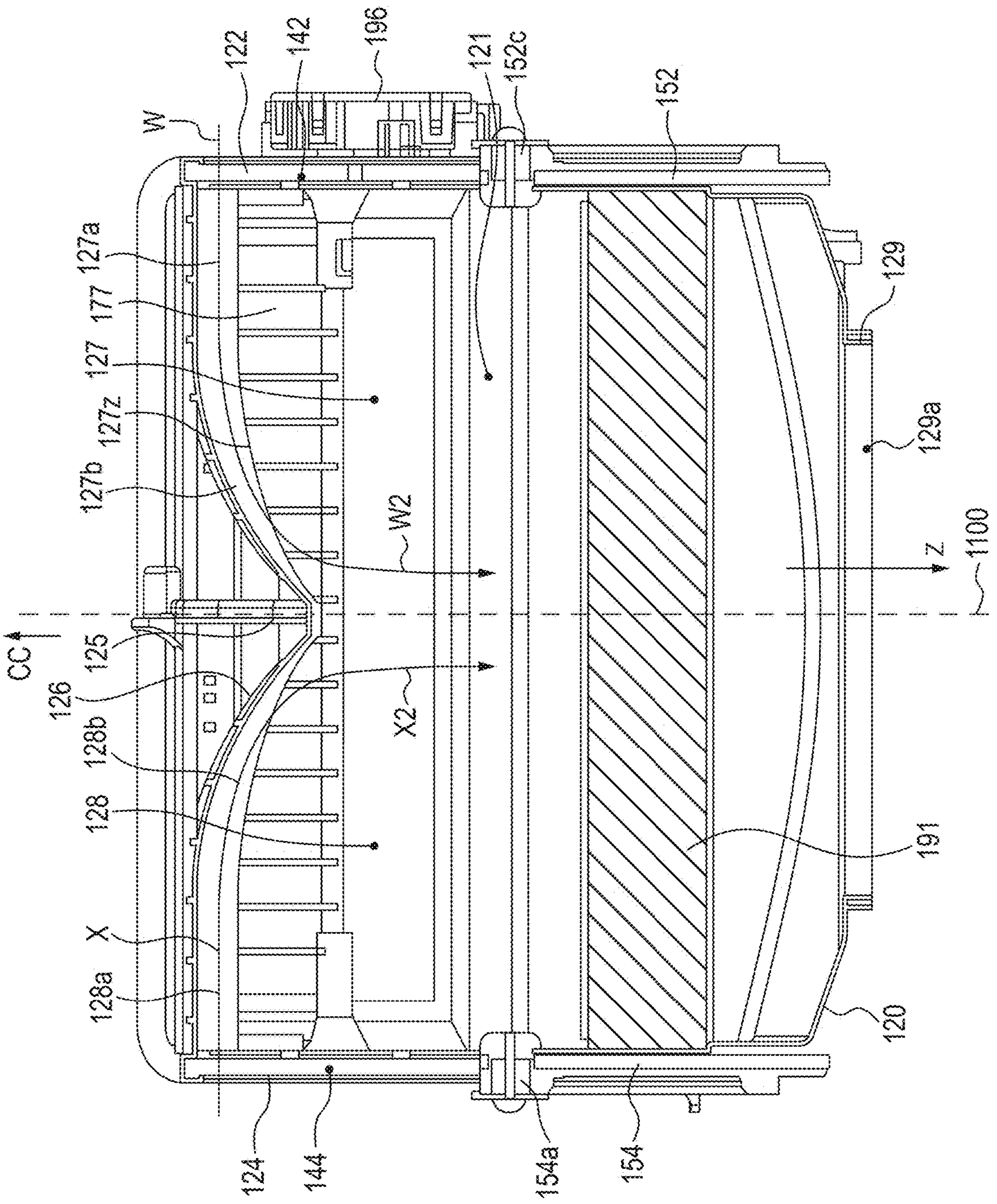
FIG. 7 is a front cross-sectional view of the air intake system of FIG. 1 about section A-A of FIG. 1.
Figure 8:
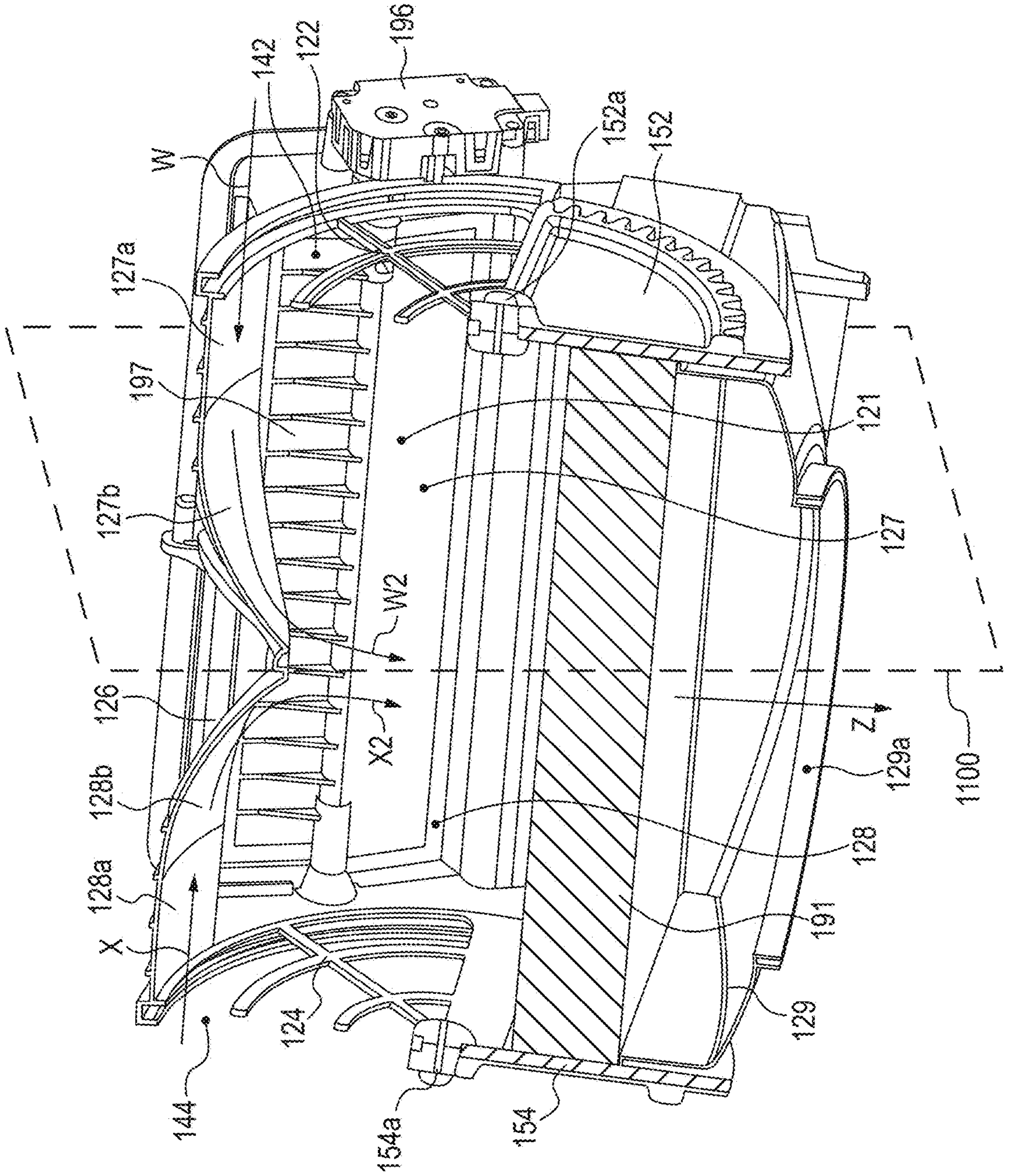
FIG. 8 is a front perspective cross-sectional view of the air intake system of FIG. 1 about section A-A of FIG. 1.
Figure 9:
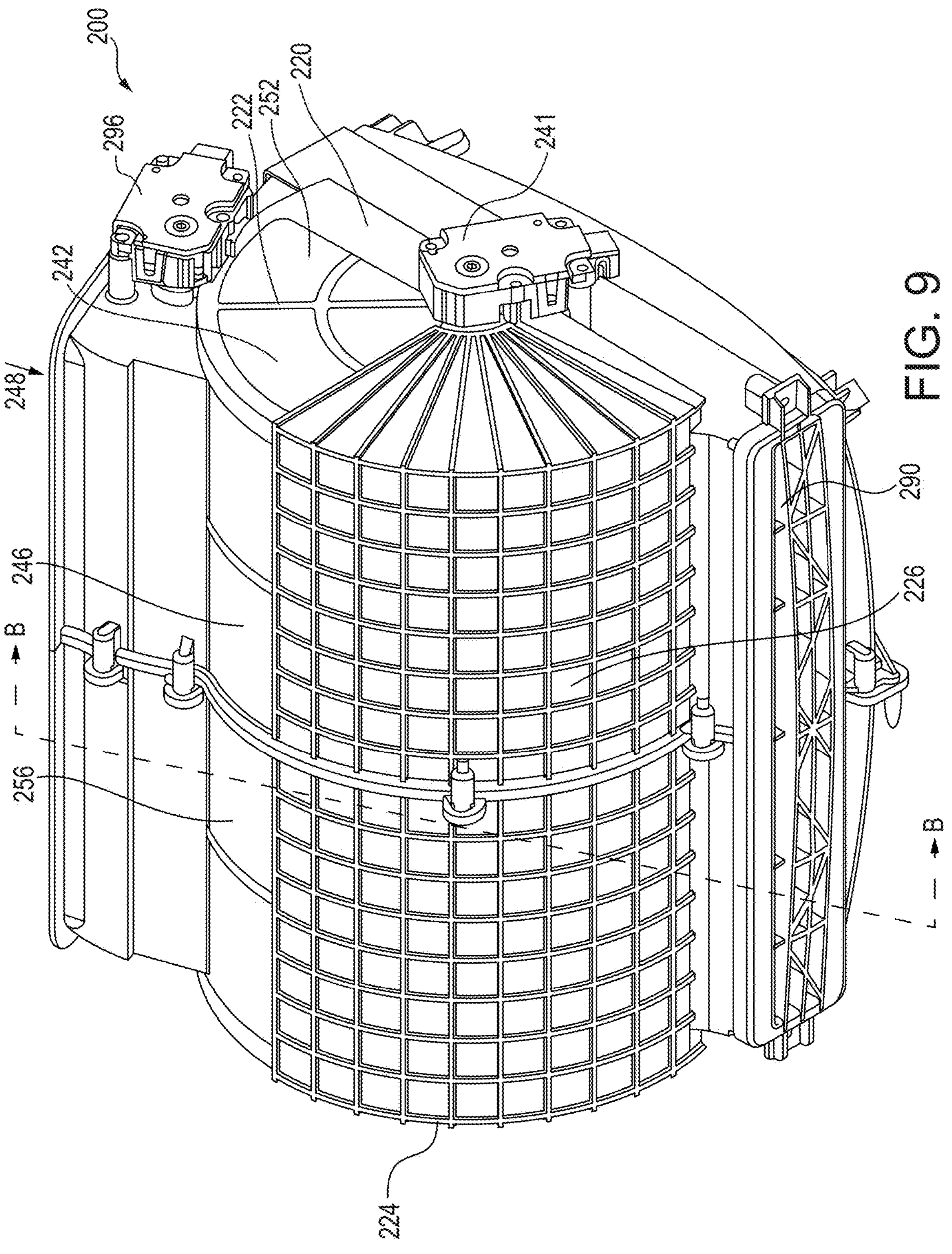
FIG. 9 is a front perspective view of another air intake system oriented to block recirculating air from a passenger compartment of a vehicle from entering the air volume of the housing.

The system 100 includes a valve system 160 that is movable with respect to the housing 120 to selectively cover the first and second air inlets 142, 144 (FIG. 1, depicting the air inlet 142, the second air inlet 144 being covered is similar), or to be withdrawn from the air inlets 142, 144 to allow air flow into the inner volume (FIG. 2, depicting the first air inlet 142, the second air inlet is similar and is depicted in FIGS. 6-8). The valve system 160 may have a first cover 152 that can be aligned with (FIG. 1) or withdrawn from (FIG. 2) the first air inlet 142, and a second cover 154 that can be aligned with or withdrawn from the second air inlet 144. The valve system 160 includes an operator 162 that can cause movement of the first and second covers 152, 154. The operator 162 may be in communication with the HVAC controller 1000 with the HVAC controller 1000 directing operation of the operator 162 based upon the desired HVAC operation by the vehicle passengers or based upon automated control by the HVAC system due to one of several sensed parameters as discussed above.

In the embodiment depicted in the figures, the first cover 152 is rotatably mounted upon the first side wall 122 with a pinned or a shaft connection 152*a*, and the second cover 154 is rotatably mounted upon the second wall 124 with a pinned or a shaft connection 154*a*. The first and second covers 152, 154 may be sized and shaped to fully cover the respective air inlet 142, 144, but be only slightly larger than the respective air inlet so that they may be rotated away from the respective air inlet and not provide any blockage of the respective air inlet when in the withdrawn position. In some embodiments, the HVAC controller 1000 may cause the operator to position the first and second covers 152, 154 in a partially blocking position to allow some limited air through the air inlets 142, 144, but less air flow into the inner volume 121 than when the covers are fully withdrawn.

The valve system 160 includes shaft 164 that is driven by the operator 162. The shaft 164 is outside of the center wall 126, i.e. the wall that directly establishes the inner volume 121 within the housing 120. In some embodiment, the shaft 164 may be disposed within an enclosure (not shown) that is fixed to the housing 120, but that enclosure is outside of the wall 126 that directly establishes the inner volume (between the first and second side walls 122, 124). The shaft 164 supports first and second gears 166, 176 that rotate with the shaft 164, with the gears 166, 176 forming pinion gears that are meshed with gear teeth 168, 178 that is fixed to the respective first and second cover 152, 154. The gear teeth 168, 178 upon the respective cover may be a rack gear, or a corresponding with pinion gear (causing rotational movement of the cover 152, 154 with rotation of the shaft 164 and pinion 166, 176). The gear teeth 168, 178 may be radially inward (or directionally inward if rack gear teeth) of the outer edge of the respective cover 152, 154 to limit the size of the pinion gear 166, 176. Accordingly, as understood with reference to FIGS. 1 and 2, with rotation of the shaft 164, the cover 152, 154 moves (rotates in the embodiment depicted) between a position to block the air inlet 142, 144 and a second position to expose the air inlet 142, 144.

The shaft 164 is disposed radially outboard of the blocking covers 152, 154, such that the axis of rotation of the shaft does not extend through any portion of the blocking covers 152, 154.

As best shown in FIGS. 7, 8 the center wall 126 may be formed with first and second sections 127, 128 (first section 127 extends to the first wall 122, and second section 128 extends to the second wall 124). The first and second sections 127, 128 meet at a center 125, through which a plane 1100 extends that is parallel, or substantially parallel, to the first and second side walls 122, 124 and is centered between the first and second side walls 122, 124. Generally, air that enters the first air inlet 142 (flow W, schematic) extends through the first section 127 and is directed downwardly (W2, schematic) toward the filter 191 (when installed) and the air outlet 129*a*, and air that enters the second inlet 144 (flow X, schematic) extends through the second section 128 and is directed downwardly (X2, schematic) toward the filter 191 (when installed) and the air outlet 129*a*. The air flow is directed in this manner due to the size and shape of the center wall 126 within the first and sections 127, 128 (identified as sections 127*a*, 127*b* and 128*a*, 128*b* in the figures).

The first and second sections 127, 128 may have the same size and shape and may be arranged oppositely, such that both sections begin at the respective air inlet (142, 144) and both end at the center 125.

The first section 127 includes a first portion 127*a* that has a cross-section (parallel to the plane 1100) that has a shape that includes a portion that is similar to the shape of the upper edge 142*a* of the first air inlet 142 (as can be understood with reference to FIGS. 2 and 7). The first portion 127*a* may have a constant cross-section along its length, as depicted in FIG. 7. The first portion 127*a* transitions to a second portion 127*b*. The second portion 127*b* includes a decreasing cross-section (parallel to the plane 1100) from the beginning of the second portion 127*b* (that transitions from the first portion 127*b*) to the end of the second portion 127*b* (at the center 125). In some embodiments, the cross-section along the second portion 127*b* continuously changes. In some embodiments, the cross-section along the second portion 127*b* continuously changes at the same rate, such that the curve that is drawn about one or more cross-sections that are perpendicular to the plane 1100 (annotated as curve 127*z* in FIG. 7) has a constant radius as the line 127 appears in the perspective of FIG. 7. In other embodiments, portions or the entire second portion 127*b* changes at a changing rate along its length (such that the curve 127*z* as it appears on FIG. 7 would have a larger radius proximate to the first portion 127*a* and a smaller radius proximate to the center 125).

In some embodiments, the first section 127 curves in an orientation parallel to the plane 1100 as the first portion transitions from a surface that faces upwardly (direction CC—i.e. upwardly from the vehicle, perpendicular to directions AA and BB) toward a surface of the center wall 126 that faces rearwardly (AA, out of the page that FIG. 7 is printed on), such that the first portion 127*a* (and specifically the inner surface thereof that faces into the inner volume 121) is shaped like the center wall 126 as depicted in FIGS. 1 and 2 (without the perpendicular lines that are depicted in the figure, which are provided on the outer surface for material strength and rigidity reasons—the inner surface of the center wall 126 includes a smooth surface). The second portion 127*b* of the first section 127 also includes a curve in the orientation parallel to plane 1100 as the second portion 127*b* extends from the first portion 127*a* to the center 125. The curves (both the curves in the direction perpendicular to the plane 1100 and also the curve parallel to the plane 1100) urge air that flows into the internal volume 121 to begin flowing with a downward vector (i.e. toward the outlet aperture 129*a*) upon flowing across the first portion 127, as is depicted schematically with arrow W2.

The second section 128 may be shaped in the same manner as the first section 127 as discussed above, such that the first portion 128*a* has the same size and shape as first portion 127*a* and the second portion 128*b* has the same size and shape as the second portion 127*b*. Alternatively, the second section 128 may have be orientated in the same manner as the first section, but could, for example, have a smaller change of radius along the second portion 128*b* than the second portion 127*b*. In embodiments where the first and second portions 127, 128 have different sizes and shapes, those may be determined through routine optimization by one of ordinary skill in the art to result in the desired smooth flow (laminar or close to laminar) through the inner volume 121 out of the outlet aperture 129*a*. The differences in the two sections could, in some embodiments be driven by the difference in length of the flow tubing from the passenger compartment to reach the respective first and second air inlets 142, 144, with an air inlet with a longer flow from the passenger compartment needed to reach the respective air inlet necessitating a different flow profile within the respective portion 127, 128.

Turning now to FIGS. 9-14, a second air intake system 200 is provided. The second air intake system 200 has many of the features of the first air intake system, and features that have the same structure or features that function similarly have element numbers with the same tens and ones digits. Differences between features between the first and second air intake systems 100, 200 are discussed herein.

The second air intake system 200 includes a housing 220 that is configured to rest upstream of the fan housing such that air that flows through an outlet aperture 229*a* of the bottom surface 229 of the housing 220 flows to the suction of the fan 410. The housing 220 is configured for smooth air flow therein such that the air is laminar or close to laminar as it flows through the inner volume 221 and flows through the air outlet 229*a*.

Figure 12:
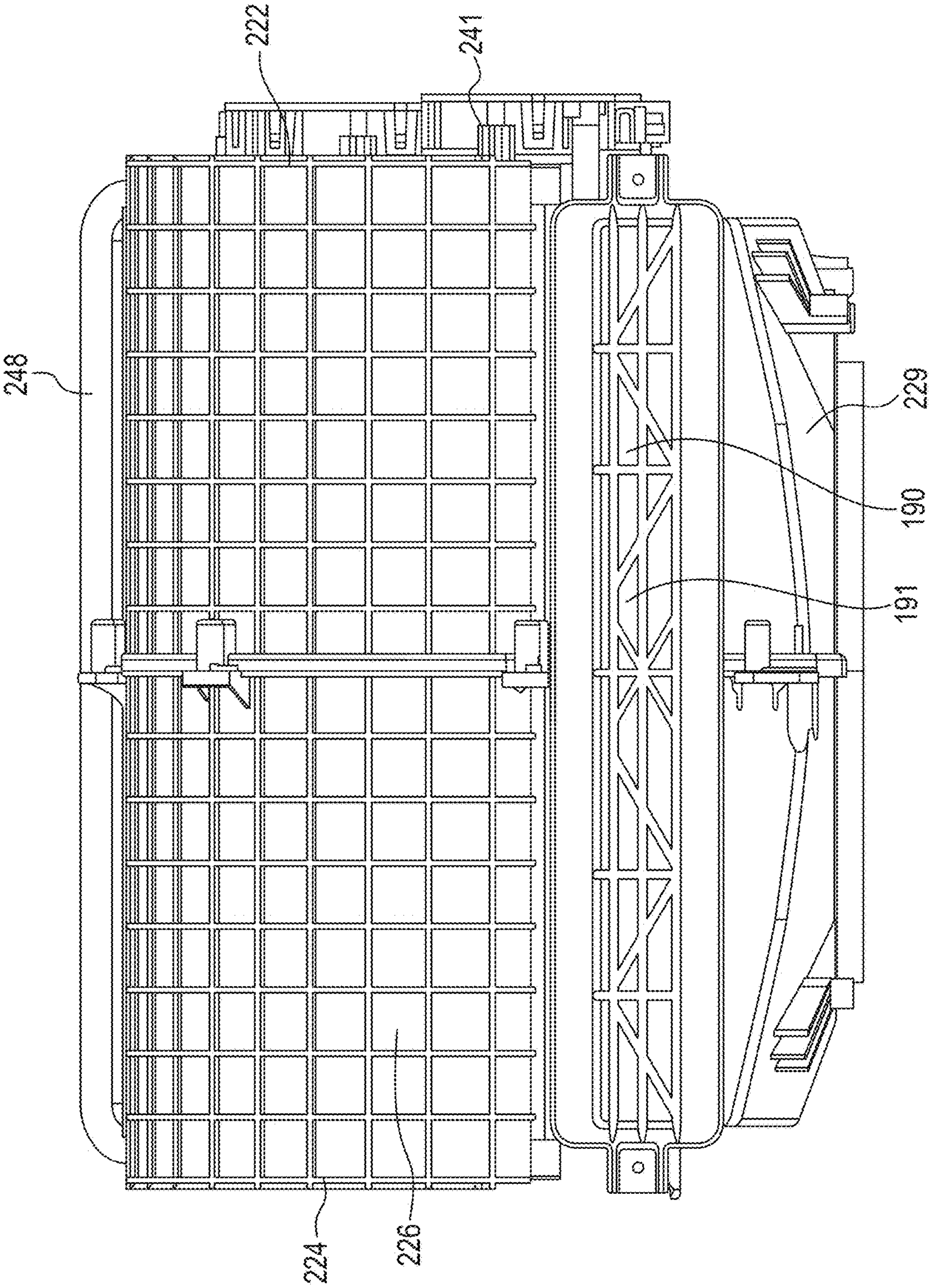
FIG. 12 is a rear view of the system of FIG. 9 (from the passenger compartment) depicting that the center air inlet apertures of the housing are not visible from the passenger compartment.

The housing includes first and second side walls 222, 224 that are parallel or substantially parallel to each other (and be constructed and arranged similar to the side walls 122, 124 discussed above) and a center wall 226 that extends above the top edges 222*a*, 224*a* of the first and second walls 222, 224. The center wall establishes the surfaces that face in the front and rear directions (front direction toward the front of the vehicle, rear direction toward the passenger compartment of the vehicle (FIG. 12 is side view that shows the rear facing surface of the center wall 226.

The housing 220 has a first air inlet 242 (through first side wall 222), a second air inlet 244 (through second side wall 224), and a center air inlet 246 (through the center wall 226) that receives recirc. air from the passenger compartment of the vehicle and a second air inlet 248 that receives outside air (flow Y, schematic). The second air inlet 248 may the same as the second air inlet 148 discussed above, and the housing 220 may support a valve 297 that operates in the same manner as the valve 197 discussed above.

Figure 10:
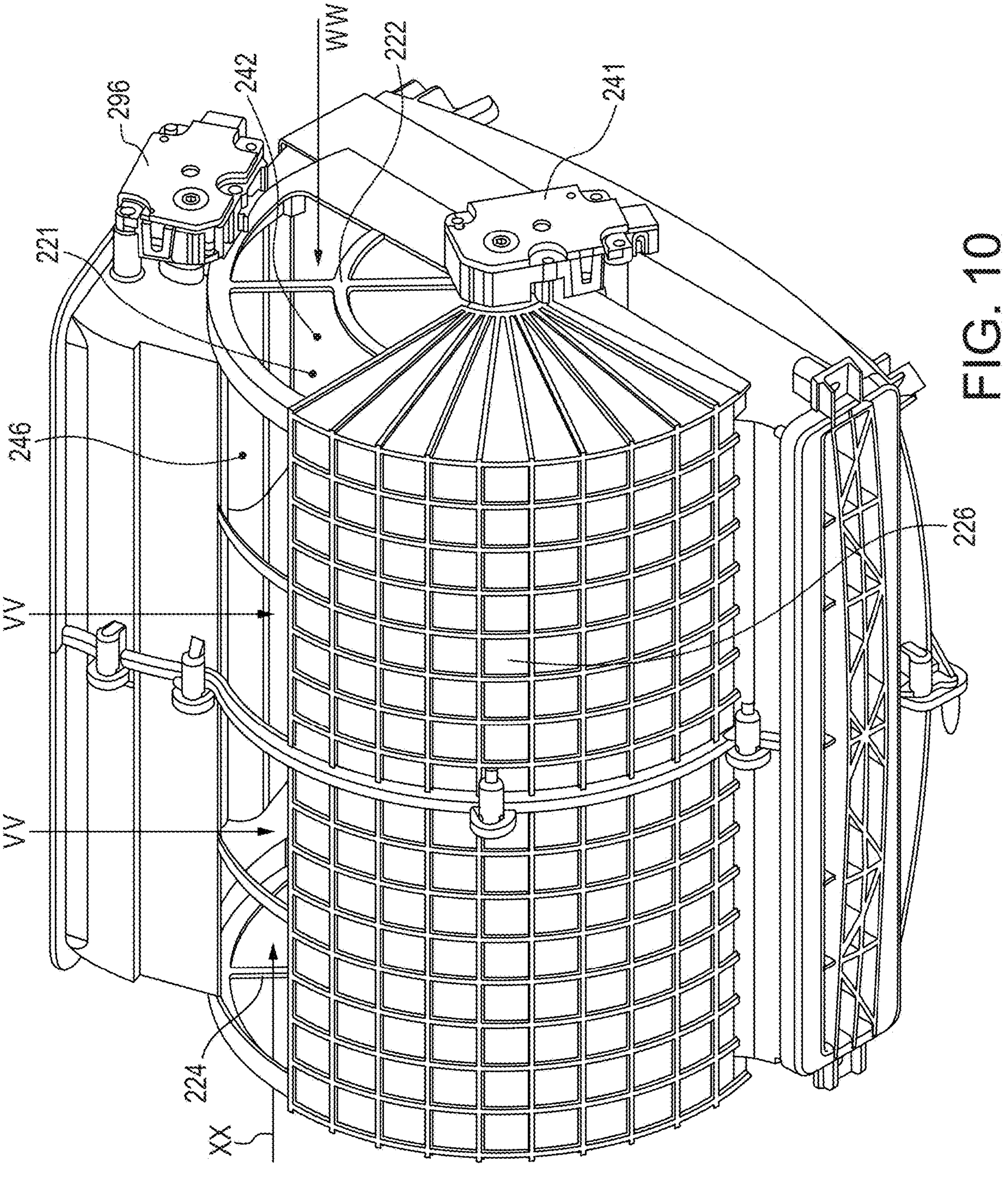
FIG. 10 is the view of the system of FIG. 9 with the system oriented to allow recirculating air to flow from the passenger compartment of the vehicle and into the inner volume of the housing.
Figure 11:
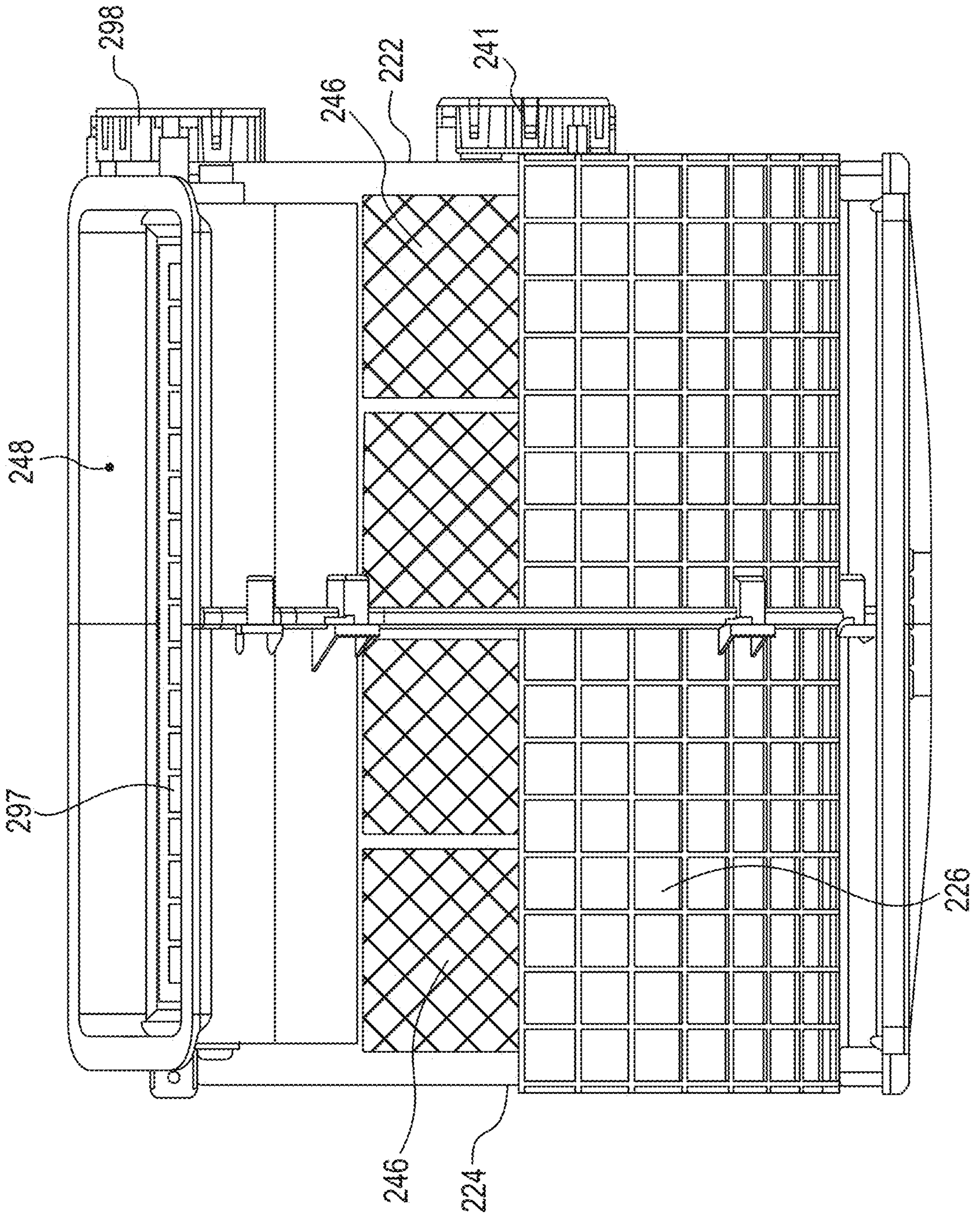
FIG. 11 is a top view of the system of FIG. 9 in the orientation of FIG. 10.

The center wall 226 includes an aperture 246 that allows recirc. into the internal volume 221, as depicted in FIGS. 10 and 11, with the aperture 246 shown with "x" hatching in FIG. 11. The center wall 226 is aligned such that the center wall faces entirely upward, or in other embodiments upward without a portion that extends through any portion of the center wall 226 that faces with a vector component in the rearward direction (AA, FIG. 15). As depicted in FIG. 12, (view from the passenger compartment, in the direction BB) no portion of the center wall aperture 246 is visible. Accordingly, air that enters into the inner volume 221 from the aperture 246 flows either vertically downward (into the page that FIG. 11 is printed on), or with a vector component that extends in direction AA (or with a vector component that extends in directions toward one of the first or second walls 222, 224, but without a vector component that extends in the direction BB).

Figure 13:
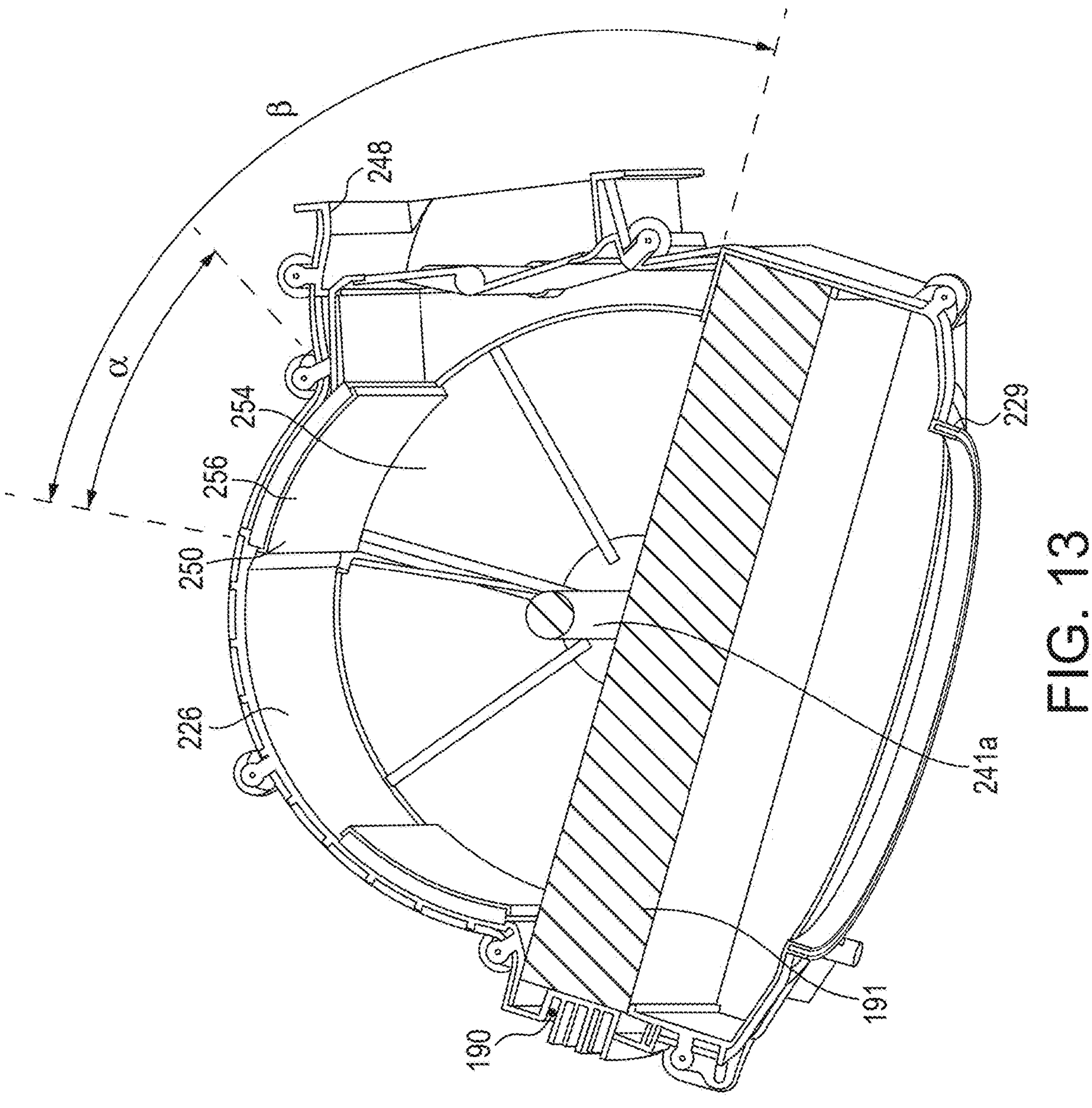
FIG. 13 is a perspective sectional view of cross-section B-B of FIG. 9, with the system in the orientation of FIG. 9.
Figure 14:
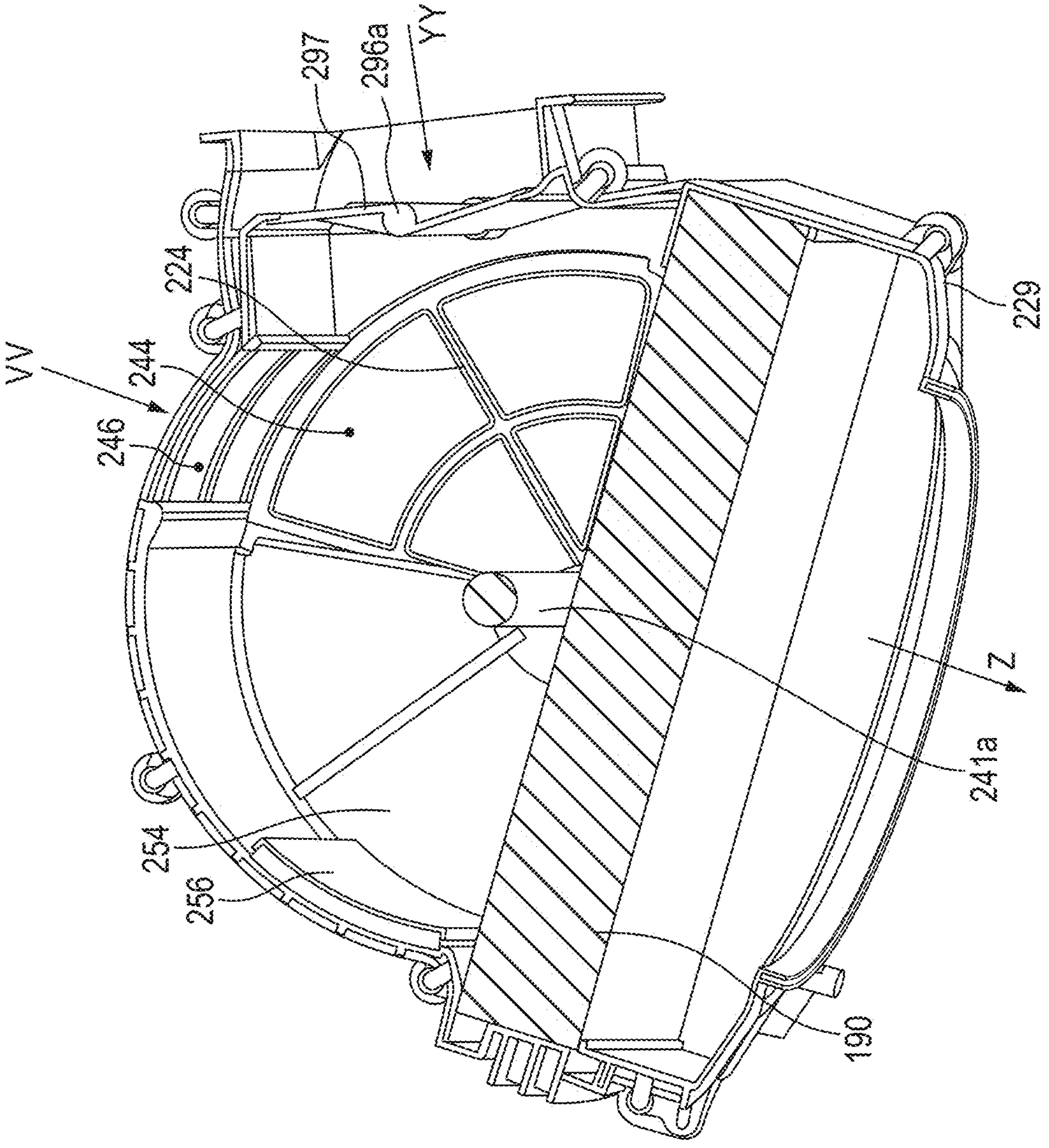
FIG. 14 is a view from the view of FIG. 13 with the system in the orientation of FIG. 10.

In the embodiment depicted in FIGS. 9-14, a valve 250 is provided that can block the first air inlet aperture (242, 244, 246) to prevent recirc. air to flow into the inner volume 221 (FIGS. 9, 13), and can be withdrawn from the apertures 242, 244, 246 to allow air to flow through the apertures (FIGS. 10, 11, 14). In the embodiment depicted, an operator 241 is provided and is aligned with an center shaft 241*a* that extends through the inner volume 221 of the housing 220, with the valve to rotate with rotation of the shaft 241*a*. The valve 250 may include a first portion 252 that can block or expose the air inlet 242 on the first side wall 222, a second portion 254 that can block or expose the air inlet 244 on the second side wall 224, and a center portion 256 that can block or expose the air inlet 246 on the center wall 226. All three of the portions 252, 254, 256 may be rigidly mounted with respect to each other to move as a unit, due to rotation of the shaft 241*a*. In some embodiments, the valve 250 may be in an intermediate portion (not shown) between the fully open (FIG. 14—allowing air flow into the inner volume 221) and the fully closed (FIG. 13) positions, similar to the operation of the valve of the system 100.

As can be best understood with reference to FIGS. 13 and 14, the center air inlet aperture 246 may have a radial length (from the end closest to the passenger compartment to the end closes to the front of the vehicle) that extends along angle α (FIG. 13) and the side air inlet apertures (242, 244) that extend along a longer angle β. The arc length of the side air inlet apertures is less than half of the overall range of motion of the valve 250 such that the valve can be fully retracted to the open position (FIG. 14) to fully expose the side air inlets 242, 244.

In some embodiments, the inner surface of the housing 220 of the center wall, specifically the surface that borders the inner volume 221 may have a relatively smooth surface, such that the center valve portion 256 can withdraw from the center air inlet 246 and be proximate to the center wall (FIG. 14) to not materially reduce the total volume of the inner volume 221 when the valve 250 is in the withdrawn position.

Figure 17:
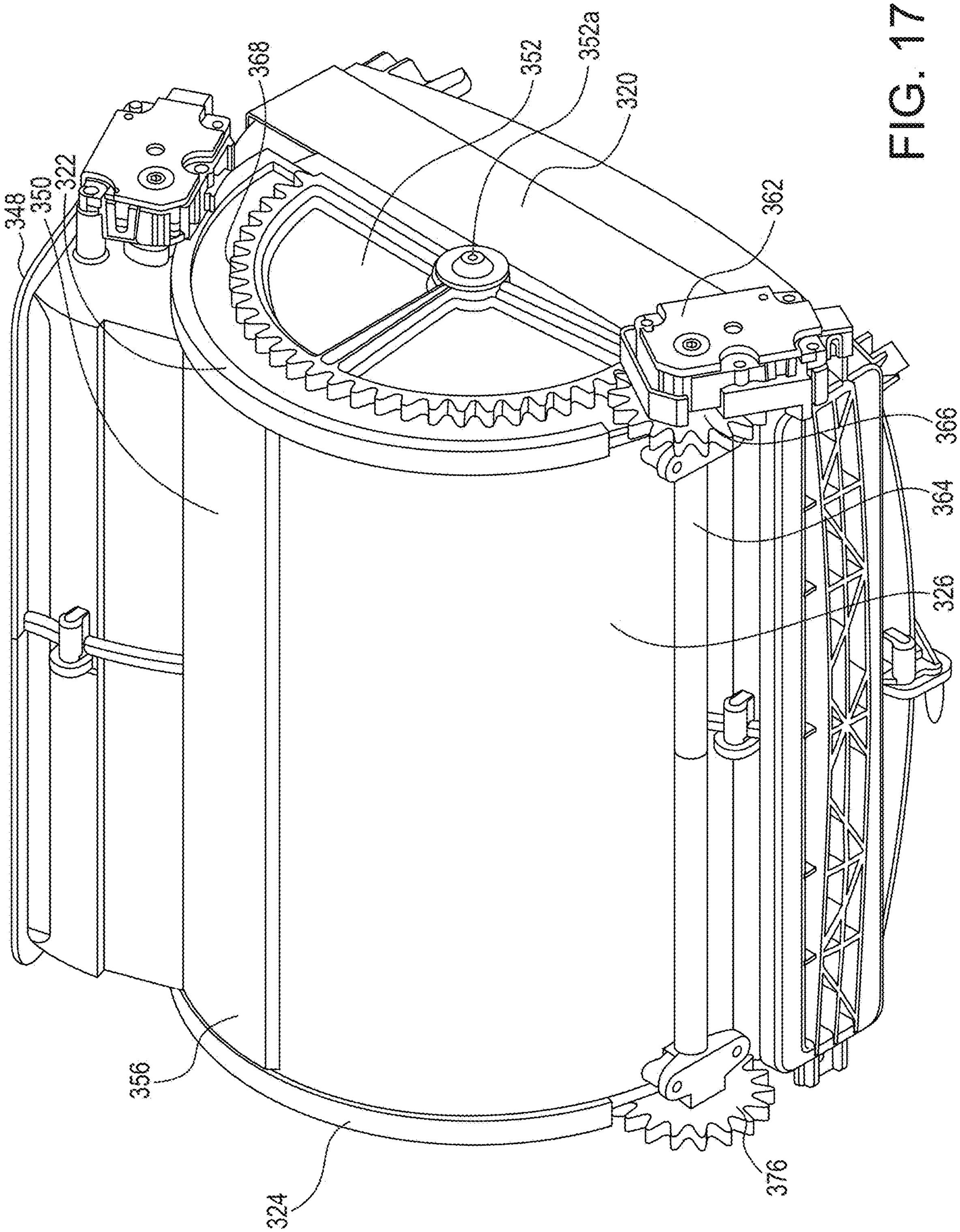
FIG. 17 is a perspective view of another air intake system oriented to block recirculating air from a passenger compartment of a vehicle from entering the air volume of the housing.
Figure 18:
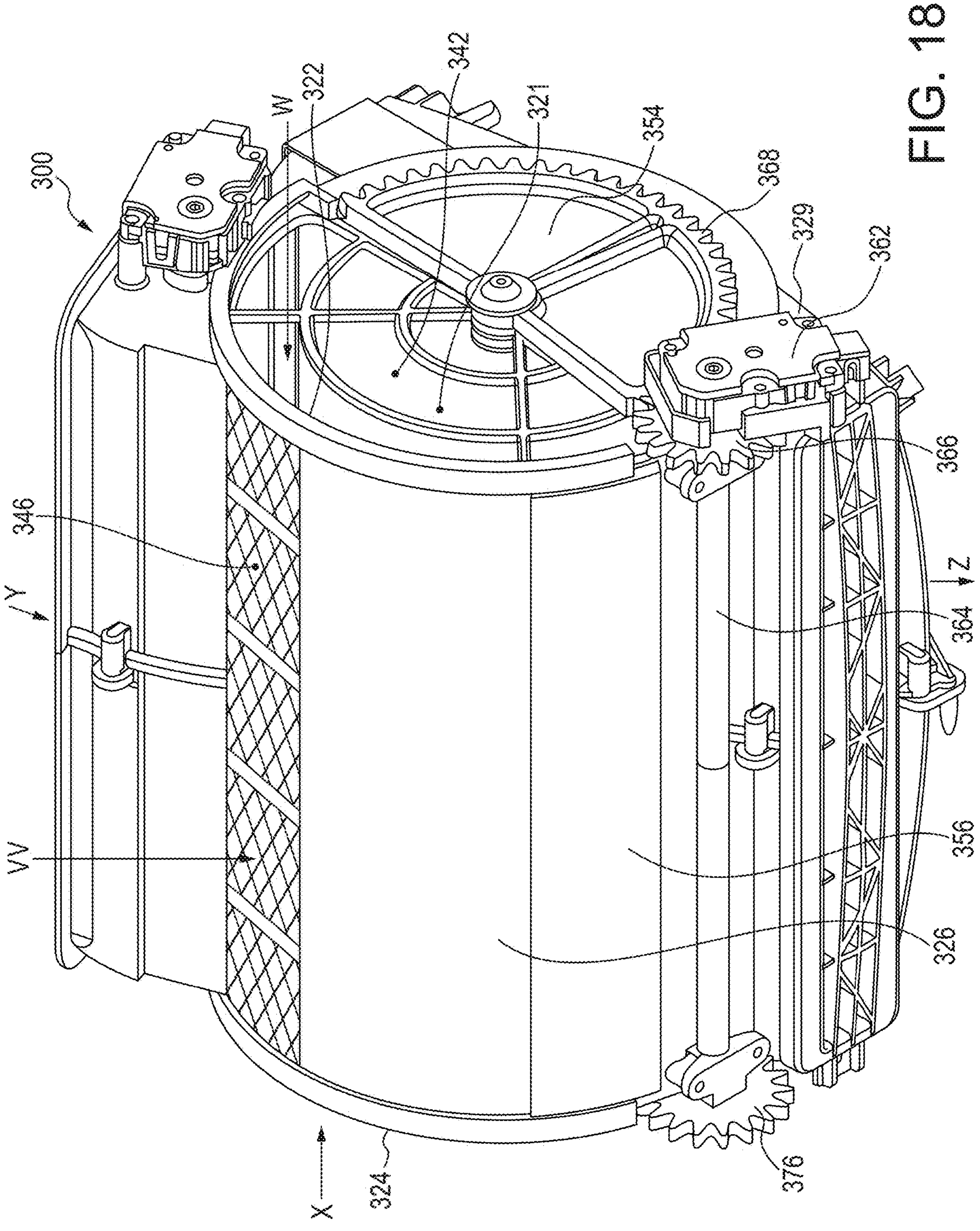
FIG. 18 is the view of FIG. 17 with the system oriented to allow recirculating air to flow from the passenger compartment of the vehicle and into the inner volume of the housing.

In a further embodiment, depicted schematically in FIGS. 17 and 18 another air inlet system 300 is provided. The system 300 includes some features from system 100 and some features from system 200. The system 300 includes first and second side walls 322, 324 and a center wall 326 that extends between the first and second side walls. The center wall 326 and the side walls 322, 324 may be formed in a similar manner to the side walls 222, 224 and the center wall 226 of the second system discussed above. The side walls 322, 324 may include air inlet apertures 322, 324 similar to the apertures 222, 224 discussed above. The center wall 326 includes an air inlet aperture 326 (FIG. 18, aperture annotated with "x" hatching in the figure) that is similar to the center aperture 226 discussed above.

The housing 220 supports a movable valve 350 that can cover (FIG. 17) or expose (FIG. 18) air inlet apertures (or can be in an intermediate position exposing only a portion of the apertures). The cover 350 includes a first blocking portion 352 that moves along the first side wall 322 and is similar to first cover 152 discussed above, and a second blocking portion (not shown in the views of FIGS. 17 and 18) that moves along the second side wall 324 and is similar to second cover 154. The valve 350 includes a third cover 356 that moves outside of an about the center wall 326 to block or expose the center aperture 326. In the embodiments depicted in FIGS. 17 and 18, the third cover 356 moves outside of the center wall 326, while in other embodiments, the third cover could be inside of the center wall 326—similar to the center portion 256 of the valve 250 discussed above.

The movable valve 350 may be movable with a transmission that is similar to the transmission of the valve system 160, with an operator 362 that rotates a shaft 364. The shaft receives one or two pinions 366, 376 that mesh with a respective gears upon the end covers 352, 354 (similar to the gears upon the end covers 152, 154) such that rotation of the shaft causes either rotation or linear motion of the end covers 352, 354. The end covers 352, 354 are fixed to the third cover 356, such that the third cover moves as the end covers move 352, 354. Similar to the transmission 160, the shaft 364 is disposed outside of the housing 220 that directly forms the inner volume 321 of the housing 320 (although the housing may support an enclosure for the shaft 364, 366 that is outside of the housing component that directly forms the inner volume.

In other embodiments, the system 300 may be formed with a housing 320 that is formed like the housing 120 discussed above (i.e. with first and second portions 127, 128 that include a changing cross-section as they approach a center plane, to direct air that flows into the inner volume 321 from the side openings 342, 344 (W, X—like FIGS. 7, 8) in a downward direction. In this embodiment, the housing 320 may also include a center aperture 326, as discussed above. The center aperture 326 may be such that it extends through portions of the center wall 326 that face directly upward, or do not face with a vector component that faces in a rearward direction (AA)—like the center aperture 246 discussed above. In this embodiment, the third cover 356 would be outside of the center wall 326 to allow free motion between the covered and the open positions (FIGS. 17, and 18—respectively—showing the other type of housing for this embodiment).

Figure 21:
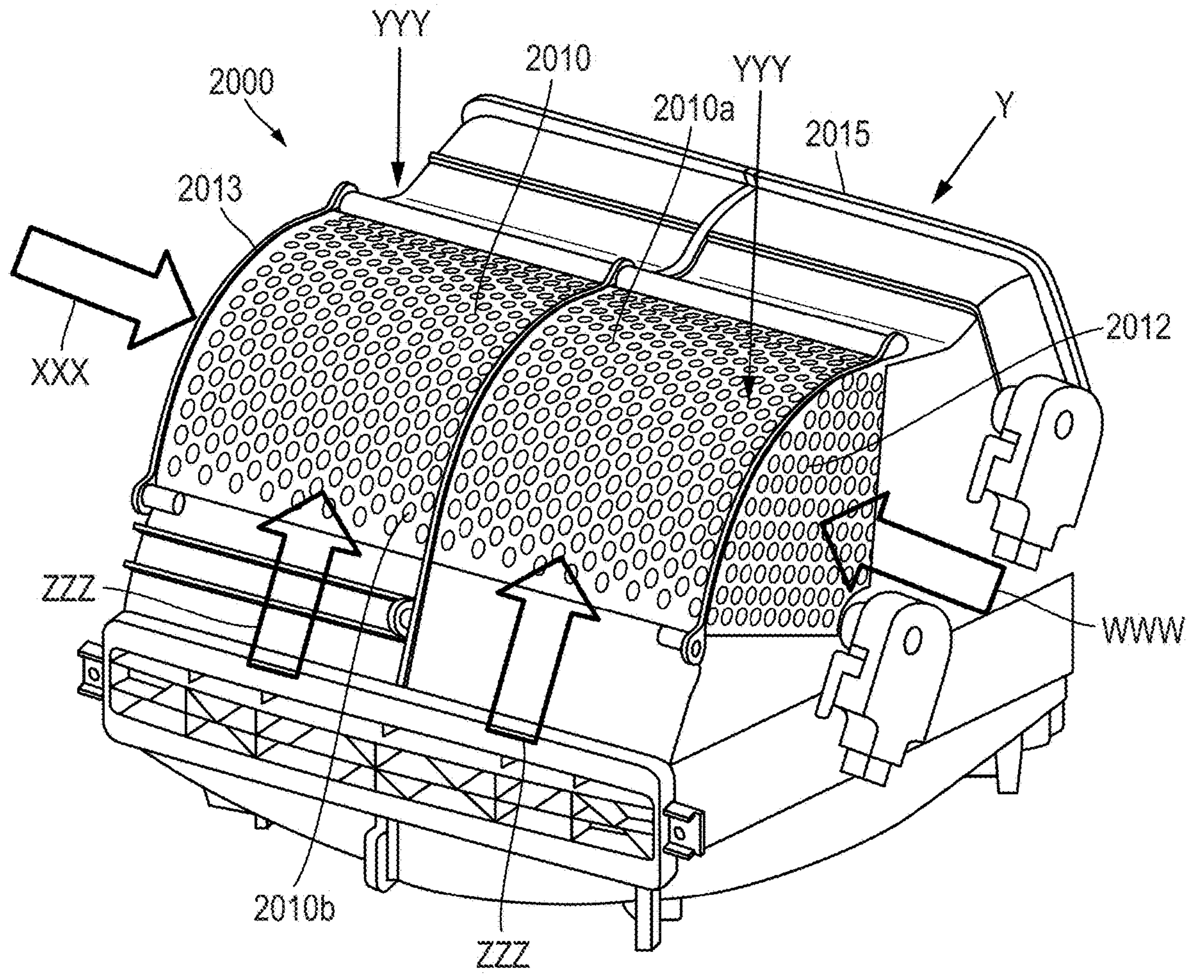
PRIOR ART FIG. 21
FIG. 21 is a perspective view of a conventional air intake housing for use with the HVAC system of FIGS. 15 and 16.

Turning now to FIG. 21, a perspective view of a conventional air intake system 2000 that is configured to be used with the vehicle HVAC system 10 is provided. The conventional air intake system 2000 can be provided upon the HVAC system that is depicted in FIGS. 15 and 16 instead of the inventive air intake systems 100, 200, 300 that are described herein.

The conventional air intake system 2000 a housing that allows air flow therein and directs air to the downstream fan. The housing within system 2000 includes a first opening 2010 that is formed along a top/center wall of the housing, and opposite side openings 2012, 2013 that are formed on opposite sides of the first opening 2010. The opposite side openings 2012, 2013 are formed on the right and left sides of the housing (as right and left are defined herein—i.e. when housing 2000 is installed upon the system depicted in FIG. 15, the right side opening 2012 would face the top edge of the sheet of paper that FIG. 16 is printed on and the left side opening 2013 would face the bottom edge of the sheet of paper that FIG. 16 is printed on. The first opening 2010 and the left and right side openings 2012, 2013 may be formed with a grate with a plurality of closely arranged small apertures to allow air to flow therethrough, but prevent large items from passing through the grate. The first opening 2010 may be formed along a portion of the center surface of the system 2000 and may extend along a curve such that a portion 2010*a* of the first opening faces upwardly (i.e. out of the page that FIG. 16 is printed on if the system 2000 was installed into the system of FIG. 16), and transitions to a rearwardly facing portion 2010*b* (i.e. toward the right edge of the page that FIG. 16 is printed on if installed upon the system depicted in FIG. 16) such that the rearwardly facing portion faces toward the passenger compartment of the vehicle that includes the system that system 2000 is provided upon.

The system 2000 may include a valve that is movable between a first position to block the first and left and right side openings (2010, 2012, 2013) to prevent recirc air from the passenger compartment from flowing therethrough to the fan and to allow outside air (Y) to flow into the housing of the system 2000 and to the fan. The valve may be repositioned to a second position to block the flow of outside air (Y) into the system 2000 but allow flow of recirculating air from the passenger compartment to flow into the system 2000 simultaneously from the first opening 2010 (V V) and the right and left openings (W, X). The position of the valve is controlled by the HVAC controller in a similar manner to the systems 100, 200, 300 discussed above.

The HVAC unit (FIGS. 15 and 16, with the conventional air intake system 2000 or with the inventive systems 100, 200, 300 may installed within a vehicle such that the housing is positioned behind the vehicle's dashboard (from the perspective of the driver or the passenger of the vehicle). Typically the inlet housing for an HVAC system is positioned within the dashboard proximate to the passenger side of the vehicle. It is typical that the vehicle's dashboard is very close to the position of the housing of the air intake system, particularly close to apertures that are formed in the center of the intake housing (e.g. like the first opening 2010 in the conventional housing 2000). The systems 100, 200 based upon sound and power usage testing have been determined to have significantly superior performance when compared to the conventional system (2000) that is discussed below. These performance improvements with the inventive air intake systems 100, 200 are an unexpected results when compared to the performance of an HVAC system with a conventional air intake system (2000, FIG. 21). The performance improvements of the air intake systems 100, 200 over an HVAC system with a conventional air intake housing also solves a long felt need in the art. Particularly, with conventional HVAC systems, i.e. HVAC systems that include conventional air intake systems 2000, there is a typically significant increase in noise generated by the HVAC system (as can be observed by the vehicle driver—for vehicles that are arranged to drive upon the right side of the road such as in the United States or Germany) when the HVAC system is operating with recirc air (i.e. air being draw into the housing that traveled from the passenger compartment and through the recirc inlets—air flows WWW, XXX, ZZZ, YYY—FIG. 21) than when the HVAC system is operating with outside air only (flow Y (FIG. 21)). It has long been desired for HVAC system performance to include no perceptible change in noise level to the vehicle driver between HVAC operation with recirc air and outside air—and it would be even more beneficial if the perceptible noise level of the HVAC system decreased when in recirc mode.

Figure 19:
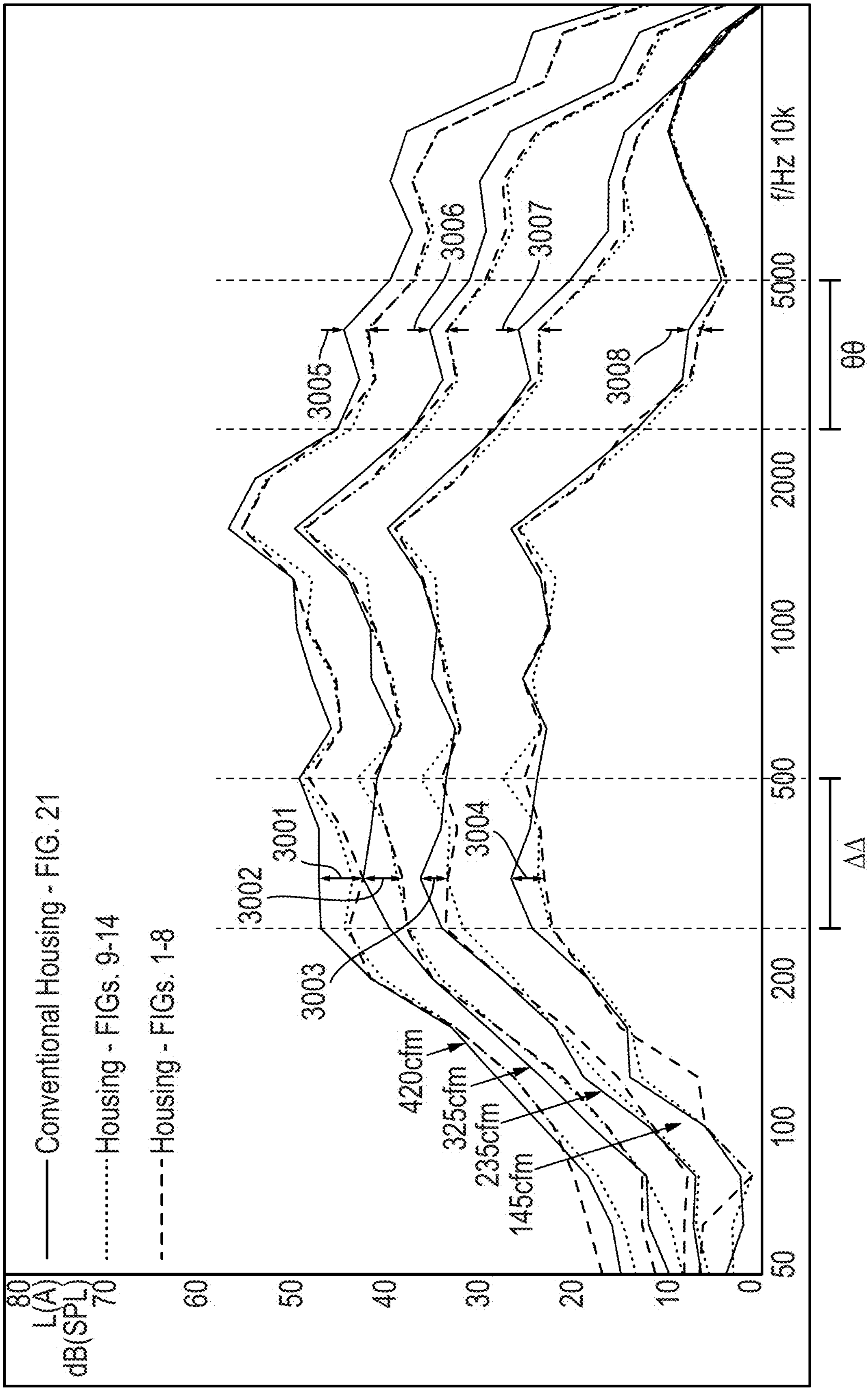
FIG. 19 is a chart that plots the measured Sound Pressure Level (SPL) from the position of a driver's right ear (in a vehicle that is arranged to drive on the right—e.g. for the United States or Germany) based upon operation of three different air intake housings (the housing 100 of FIGS. 1-8 (broken line); the housing 200 of FIGS. 9-14 (dotted line), the conventional housing of FIG. 21 (solid line) at different air flow rates when recirculating air is drawn into the respective housing and no outside air is drawn into the respective housing.

FIG. 19 is a graph of measured noise of an HVAC system during operation at a position consistent with the right ear of a driver (for a vehicle set up for driving on the right side of the road, e.g. United States, Germany) for the same HVAC system with different types of air intake systems, (i) the conventional system as depicted in FIG. 21 and described herein, (ii) the system 100 (depicted in FIGS. 1-8 and described above), and (iii) the system 200 (depicted in FIGS. 9-14 and described above). The graph plots the measured sound pressure level (SPL) (dBa) against frequency (Hz) of the sound pressure level measured along the frequency range from 50 Hz to over 10,000 Hz. Sound pressure level is a typical measurement of sound, and sound pressure level measurement is a measurement that is well known by those of ordinary skill in the art. The graph of FIG. 19 includes the measured sound pressure level for the three different air intake systems provided upon the same HVAC system (similar to that depicted in FIGS. 15 and 16) when operated in recirc mode (with no outside air intake). The test set up for each test run was the same, so that the only changes were that the specific different air intake systems (100, 200, conventional) were installed within the same HVAC system—and each were operated at the same different air flow rates of air discharging from the fan. The same testing environment was used for all test runs and the same data acquisition sensors was used for all test runs. Sound pressure level for the three different air intake systems was measured across the entire frequency range at four different air flow rates from the fan discharge for each system that resulted in 145 cfm, 235 cfm, 325 cfm, and 420 cfm of air flowing from the discharge of the fan and into the HVAC housing 500.

FIG. 20 is a chart that provides the average sound pressure level that was detected with the detected data averaged across the entire frequency range that is depicted in FIG. 19 for each type of air intake system (system 100, system 200, and the conventional system of FIG. 21) for each air flow level depicted in FIG. 19 (column C). FIG. 20 also includes the averaged sound pressure level across the same frequency range for the system 100, the system 200, and the conventional system of FIG. 21 set up for outside air intake (and no recirc air intake) for each data set (e.g. each of the three system at a flow of 145 cfm, 235 cfm, 325 cfm, and 420 cfm)

Figure 19A:
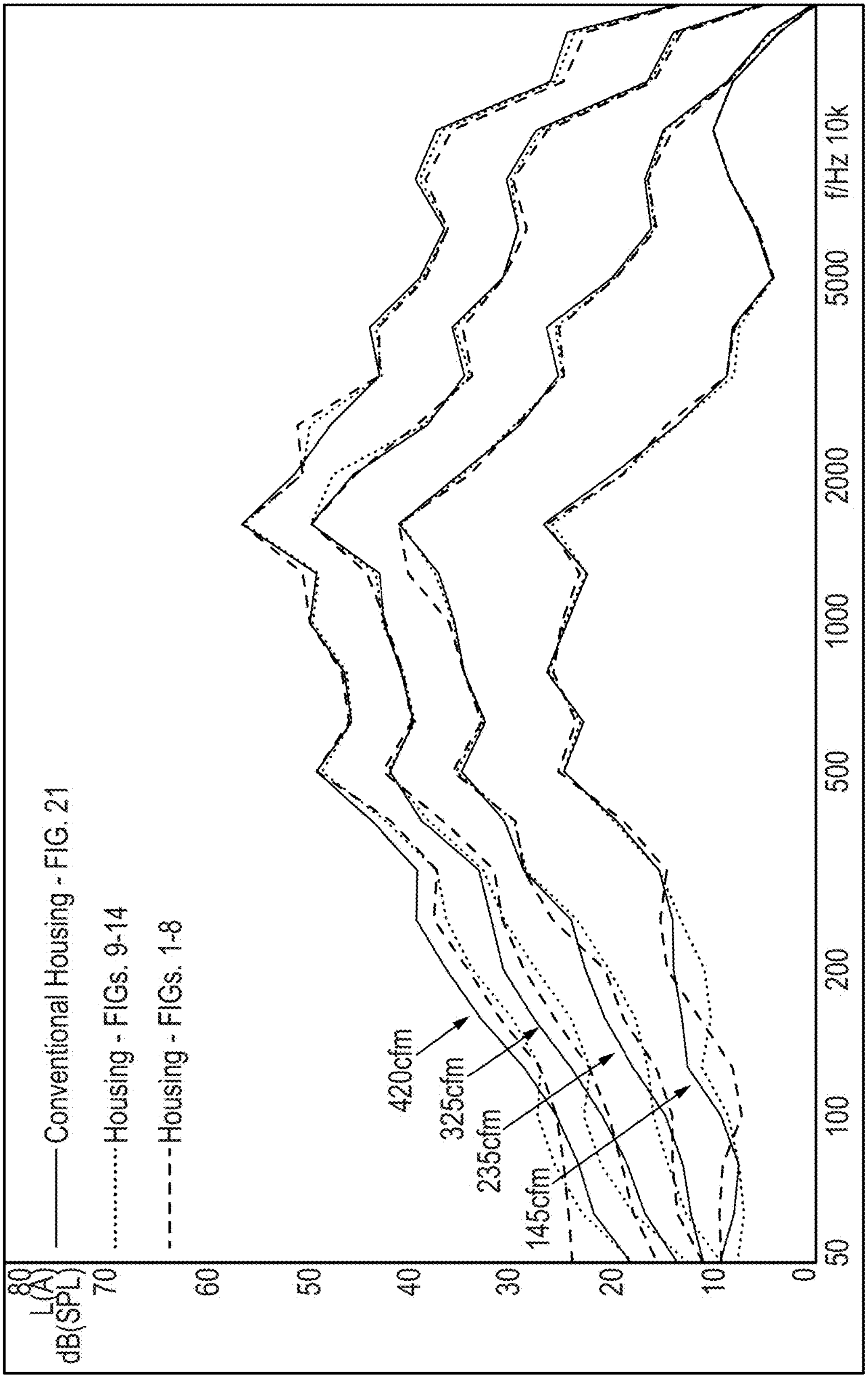
FIG. 19A is a chart similar to the chart of FIG. 19 that plots the measured Sound Pressure Level (SPL) from the position of a driver's right ear (in a vehicle that is arranged to drive on the right—e.g. the United States or Germany) based upon the operation of three different air intake housings (the housing 100 of FIGS. 1-8 (broken line); the housing 200 of FIGS. 9-14 (dotted line), the conventional housing of FIG. 21) (solid line) at different air flow rates when outside air is drawn into the respective housing and no recirculating air is drawn into the respective housing.

(sound pressure data for outside air intake only provided in FIG. 19A (Column B). The right most column (Column D) provides the difference between the average sound pressure level for each test run with the respective system set up for outside air intake (flow Y) with no recirc air intake (Column B—average of FIG. 19A)—and the average sound pressure level for each test run with the system set up for only recirc air intake (W and X for air intake system 100, W W, X X, and V V for air intake system 200) (Column C—average of FIG. 19). Positive values Column D reflect that the measured average sound pressure level when the respective system is set up for recirc flow with no outside air flow (FIG. 19) is greater than the measured average sound pressure level when the when the air intake system is set up for outside air flow and no recirc air flow (FIG. 19A). Negative values in the right column reflect that the measured average sound pressure level when the respective system is set up for recirc air flow with no outside air flow is less than the measured average sound pressure level when the when the system is set up for outside air flow and no recirc air flow.

As can be appreciated, negative values in Column D are desirable because the average sound pressure level for operating the specific HVAC system with recirc flow (and no outside air flow) is less than the average sound pressure level for operating the specific HVAC system in the outside air intake (and no recirc flow). It is typical in the industry that sound pressure level is higher for HVAC operation with recirc air than with outside air. The data provided in FIGS. 19, 19A, and 20 identifies that both the system 100 and the system 200, described above, have excellent performance in comparison to the conventional system with air flows of 235 cfm, 325 cfm, and 420 cfm. The frequency wide average sound pressure level during recirc operations for all three of these air flow rates being at least 1.0 dBa less than the frequency wide average sound pressure level when the same system is operated with outside air only. Also, as discussed below, the data presented on FIG. 19 depicts that the inventive systems 100, 200 have significantly lower average sound pressure levels than the conventional system with the same air flow rates in recirc operation (with no outside air intake).

A sound pressure level difference of 1.0 dBa (at perceptible sound magnitudes) is a significant difference and is typically perceptible to a human within the ranges of human hearing or sensing (sound pressure is also sensed by humans as a vibration for low frequencies within the range of human hearing). As mentioned above, HVAC systems typically have a higher sound pressure level when operating in recirculation mode than when operating with outside air intake—as understood with review of FIG. 20 for the conventional air intake system (FIGS. 21) at 145 and 420 cfm flow rates (the 235 and 325 cfm flow rates are virtually identical). The operation of systems 100, 200 within the HVAC system of FIGS. 15, 16 when operated with recirc flow and no outside flow intake provides a lower average sound pressure level than the operation that same system with the same air flow rate when operated with outside air intake with no recirc air intake. This decrease in the average sound pressure level is an unexpected result from what has been consistently observed from HVAC systems like FIG. 15, 16 with a conventional air intake system (FIG. 21). There has long been a need/desire in the automotive industry for HVAC systems that do not become noisier when operated in recirc mode, and the air intake systems 100, 200 have been determined to meet that need.

With lower air flows within an HVAC system (e.g. 145 cfm) the total amount of noise/vibrations from the HVAC is dominated by features other than the air inlet, thus the noise generated by the air inlet is masked and not perceptible by humans. For example, at low airflows, noise from the air inlet may be lower than noise from the blower, HVAC outlets and noise due to air flowing through duct work. In this instance, the air inlet noise is covered by the downstream noise created during operation and a passenger would be unlikely to identify any air inlet noise contribution to the noise heard.

The air intake systems 100, 200 which exhibit at least a 1.0 dBa decrease in average sound pressure level when drawing in recirc air in comparison to operations with only outside air intake is a substantial decrease in average sound pressure level (4001, 4002, 4003, 4004, 4005, 4006—FIG. 20).

The air intake systems 100, 200 also exhibit significantly better performance for recirc flow in comparison to the conventional air intake system when operating in recirc flow (with no outside air intake), as depicted in FIG. 19. A first range of 300 to 500 Hz (FIG. 19, Δ Δ) is a low frequency range where sound is often perceived as a vibration in addition to perceived audibly. As shown in FIG. 19, close to the middle of this frequency range, the measured SPL for the conventional air intake system of this range is substantially higher than the measured SPL for the inventive systems 100, 200 (e.g. conventional system about 5 dBa higher than the system 100 and the conventional system about 4 dBa greater for the system 200 at the 420 cfm flow rate (3001), with other significant noise reductions at the lower air flow rates (3002, 3003, 3004). Another important range of sound is between about 3000 Hz and 5000 Hz (FIG. 19, Θ Θ), which is the typical frequency of human conversation. Within this frequency range, the sound pressure levels of the HVAC system with the inventive air intake systems 100, 200 are substantially than the sound pressure level of the conventional system at the same flow rate in recirc flow (3005, 3006, 3007, 3008). These substantial sound decreases within these frequency ranges would be readily identified by the driver of the vehicle or a passenger in the vehicle first row.

It is believed that the performance improvements in recirc mode (with no outside air intake) of the air intake systems 100, 200 when compared to the conventional air intake system (FIG. 21) are derived from the fact that all of the recirc air (system 100) and a significant amount of the air that enters into the system (system 200) is through the side openings (air flows W and X in system 100, side flows W W and X X in system 200), rather than through an opening in the center. The center portion of the housing of the air inlet system directly faces the passenger compartment (direction AA—FIG. 16). Air that enters the housing through a center opening (e.g. 2010, FIG. 21, flows Z Z Z) creates noise—a large portion of which propagates away from the housing in the direction AA from the system and even more propagates with a vector component in the direction AA. Accordingly, a significant portion of the noise created reaches the front row of the passenger compartment. Further, there is only a small space between the inner surface of the dashboard and the air inlets upon the center of the housing (e.g. 2010, FIG. 21), which creates a restrictive path for air to flow between the dashboard and the housing of the system to reach the apertures (2010) in the center to flow into the housing (flows Z Z Z and Y Y Y, FIGS. 21). The air that flows through this restrictive path generates noise that radiates into the passenger compartment as discussed above.

In contrast, with the system 100 all of the air that enters into the housing 120 of the system 100 flows through the apertures 142, 144 (air flows W, X) upon the side walls of the housing 120. A substantial portion of the noise created when air flows through the side apertures 142, 144 propagates away from the housing 120 with a vector component that is perpendicular to the direction AA (FIG. 16) i.e. toward the respective right or left sides of the vehicle (top and bottom edges of the paper that FIG. 16 is printed upon), and a smaller overall proportion of the noise created flows with a vector component parallel to the direction AA toward the passenger compartment. Further, the side openings 142, 144 are often positioned within the dashboard with more air space around the openings such that the air that enters through these openings (142, 144) does not need to flow through such as a restrictive path than the air that would enter a center opening (2010, FIG. 21) of the housing. The housing 220 of the system 200 includes a substantial openings 242, 244 on the sides of the housing 220 for air flows W W, X X (FIG. 10) into the housing. The housing 220 has openings 246 at the top of the center portion to allow air (V V, FIG. 10) to enter into the housing, but does not allow air to enter the center portion in a direction that is opposite to the direction AA (FIG. 16), or much air that has a significant vector component that is parallel to direction AA. Accordingly, only a minimal amount of sound is generated that would flow in direction AA toward and into the passenger compartment (with similar benefits to the system 100, discussed above). Further, any air that must flow through a restrictive path across the inner surface of the dashboard to reach the apertures 246 would flow across a generally horizontal portion of the dashboard and only a small component of that sound generated would extend in direction AA (or with a substantial vector component in the direction AA).

FIG. 22 is a table with measured power usage for the HVAC system fan (in watts) to generate the listed air flow rates, for the inventive air intake systems 100, 200, and the conventional system (FIG. 21) upon the same HVAC system (FIGS. 15, 16), with the air intake systems each aligned for recirc air inlet and no outside air inlet. FIG. 22 shows that at the highest air flow rate, the inventive system 100 was operated with 27 watts less of fan power for the same air flow rate (420 cfm) when compared to the HVAC system with the conventional air intake system. The inventive air intake system 200 was operated with 51 watts less of fan power for the same air flow rate (420 cfm) when compared to the HVAC system with the conventional air intake system. Substantial fan power decreases were also measured with the lower air flow rates of 235 and 325 cfm for both inventive air intake systems 100, 200 when compared to the HVAC system with the conventional air intake system. These power usage decreases are substantial (about 10% for air intake system 100, about 20% for air intake system 200 at the highest air flow rate), the power savings with the inventive air intake systems result in much more efficient operation of the HVAC system—resulting in miles per gallon increases for internal combustion engine vehicles and range increases for electric vehicles (and either mpg or range improvements for hybrid vehicles). These substantial improvements are also unexpected results based upon the structural changes for the inventive air intake systems when compared to the conventional air intake system.

The need/desire in the industry for HVAC systems that can operate the same noise level or quieter as perceived by the vehicle driver when operating in recirc mode (in comparison to outside air intake mode) is because in most circumstances recirc mode is more efficient for operating an HVAC system. For example, when a vehicle is operated in a cold temperature environment, operating the HVAC system with an outside air intake causes the HVAC system to increase the operation of the heater in order to raise the temperature of air that flows into the passenger compartment due to the large differential temperature between the current (desired) passenger compartment temperature and the outside air temperature. A significant amount of heat must be transferred to the outside (relatively) cold air as it flows through the HVAC housing (500) before it is introduced into the passenger compartment in order for the air flowing into the passenger compartment to be at a temperature to maintain the passenger compartment air temperature as desired.

Instead, if the HVAC system during the same cold weather operations can operate with recirc air, at a time when the passenger compartment is at or close to the desired temperature, the recirc air (that flowed to the air intake system from the passenger compartment) is already at or close to the temperature desired within the passenger compartment, so that air that enters into the HVAC housing (500) need receive only a small amount of heat to adjust its temperature to maintain the desired temperature within the passenger compartment. Accordingly, when using recirc air, the duty cycle or and/or the energy used by the heater in order to provide needed heat to the air within the HVAC housing (500) is relatively small in comparison to the situation where outside air flows into the HVAC housing, which would need to receive a substantial amount of heat to increase to a temperature to maintain the desired temperature within the passenger compartment.

It is understood that vehicle drivers or front row passengers may operate an HVAC system in modes to minimize the noise or vibrations that they hear/feel during operation. When vehicles are provided with the inventive air intake systems 100, 200, they may prefer operating their HVAC system in recirc (rather than with outside air intake) due to the decrease in sound/vibration that they perceive during operation of recirc air—particularly at the higher flow rates.

The term "no air intake" is defined herein to mean that the valve within the air intake system is positioned to block the unwanted air intake, but some di minimis air intake from the unwanted source may flow to the HVAC fan due to improper valve seating, wear, or due to typical tolerances that are acceptable within the industry.

The term "about" is specifically defined herein to include a range that includes the reference value and plus or minus 5% of the reference value. The term "substantially the same" is when the item under comparison is within 5% of the aspect of the reference value of the item.

The computing elements or functions disclosed herein, such as the HVAC controller 1000 may include a processor and a memory storing computer-readable instructions executable by the processor. In some embodiments, the processor is a hardware processor configured to perform a predefined set of basic operations in response to receiving a corresponding basic instruction selected from a predefined native instruction set of codes. Each of the modules defined herein may include a corresponding set of machine codes selected from the native instruction set, and which may be stored in the memory. Embodiments can be implemented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, optical disc, memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described embodiments can also be stored on the machine-readable medium. Software running from the machine-readable medium can interface with circuitry to perform the described tasks. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Naturally, in view of the teachings and disclosures herein, persons having ordinary skill in the art may appreciate that alternate designs and/or embodiments of the invention may be possible (e.g., with substitution of one or more components for others, with alternate configurations of components, etc.). Although some of the components, relations, configurations, and/or steps according to the invention are not specifically referenced and/or depicted in association with one another, they may be used, and/or adapted for use, in association therewith. All of the aforementioned and various other structures, configurations, relationships, utilities, any which may be depicted and/or based hereon, and the like may be, but are not necessarily, incorporated into and/or achieved by the invention. Any one or more of the aforementioned and/or depicted structures, configurations, relationships, utilities and the like may be implemented in and/or by the invention, on their own, and/or without reference, regard or likewise implementation of any of the other aforementioned structures, configurations, relationships, utilities and the like, in various permutations and combinations, as will be readily apparent to those skilled in the art, without departing from the pith, marrow, and spirit of the disclosed invention While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification is readily understood with reference to the following Numbered Paragraphs:

Numbered Paragraph 1: An air intake system for a vehicle HVAC system, comprising:

a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle;

wherein the air outlet allows air from within the inner volume to flow out of the housing and to a fan disposed downstream of the air outlet;

a valve that is movable with respect to the housing, the valve can be moved between a first position where air can flow through the first air inlet and into the inner volume and a second position where air is prevented from flowing through the first air inlet and into the inner volume;

the valve includes a blocking surface, wherein the blocking surface receives torque from an input that is disposed radially outboard of the blocking surface, wherein the blocking surface is movable between a first position where air is allowed to flow through the first air inlet and a second position where air is prevented from flowing through the first air inlet.

Numbered Paragraph 2: The air intake system for a vehicle HVAC system of Numbered Paragraph 1, further comprising an operator that generates torque that is transferred to the valve, wherein the operator causes rotation of an input shaft that is located outside of the housing wall that defines the inner volume of the housing.

Numbered Paragraph 3: The air intake system for a vehicle HVAC system of Numbered Paragraph 2, wherein the input shaft supports a first gear, wherein the first gear is meshed with a second gear that is fixed with respect to the blocking surface.

Numbered Paragraph 4: The air intake system for a vehicle HVAC system of Numbered Paragraph 3, wherein the first gear is a pinion gear, and the second gear is a rack gear.

Numbered Paragraph 5: The air intake system for a vehicle HVAC system of any one of Numbered Paragraphs 2-4, wherein the blocking surface includes a first blocking surface that moves across a first planar side surface of the housing wall, and a second blocking surface that moves across a second planar side surface of the housing wall, wherein the first and second planar side surfaces of the housing wall are parallel or substantially parallel to each other.

Numbered Paragraph 6: The air intake system for a vehicle HVAC system of Numbered Paragraph 5, wherein the input shaft supports a first pinion gear that transfers torque to the first blocking surface, and a second pinion gear that transfers torque to the second blocking surface, wherein the torque is transferred simultaneously to the first and second blocking surfaces when the input shaft rotates.

Numbered Paragraph 7: The air intake system for a vehicle HVAC system of Numbered Paragraph 6, wherein the first blocking surface comprises a first rack gear that is meshed with the first pinion gear and the second blocking surface comprises a second rack gear that is meshed with the second pinion gear.

Numbered Paragraph 8: The air intake system for a vehicle HVAC system of any one of Numbered Paragraphs 1-7, wherein housing wall comprises first and second side walls, the first and second side walls are each planar or substantially planar, the first and second walls being are spaced apart, the housing wall further comprises a center wall that extends between the first and second side walls, wherein the first air inlet extends through each of the first and second side walls.

Numbered Paragraph 9: The air intake system for a vehicle HVAC system of Numbered Paragraph 8, wherein the first air inlet does not extend through the center wall.

Numbered Paragraph 10: The air intake system for a vehicle HVAC system of Numbered Paragraph 8, wherein the second inlet extends through the center wall.

Numbered Paragraph 11: The air intake system for a vehicle HVAC system of Numbered Paragraph 10, further comprising a third inlet disposed through the center wall that is configured to allow a filter to extend through the third inlet such that the filter extends within the inner volume and when properly installed the filter is disposed such that air that enters the inner volume through either the first air inlet or the second air inlet passes through the filter in order to reach the air outlet.

Numbered Paragraph 12: The air intake system for a vehicle HVAC system of either of Numbered Paragraphs 8 or 9, wherein the inner volume defines a first cavity and a second cavity and a center plane that extends through the inner volume, the center plane is parallel or substantially parallel to the first and second walls and extends such that the first and second walls are both the same distance from the center plane, wherein the first cavity extends inwardly from the first wall toward the center plane, and the second cavity extends inwardly from the second wall toward the center plane, wherein the center wall comprises an inner surface that faces the inner volume and the center plane extends through the center wall, wherein a portion of the inner surface of the center wall along the first cavity and proximate to the center plane is curved as the center wall extends from the first side wall toward the center plane such that a cross-section of the inner volume parallel to the center plane decreases as the center wall extends toward the center plane, and wherein a portion of the inner surface of the center wall along the second cavity and proximate to the center plane is curved as the center wall extends from the second side wall toward the center plane such that a cross-section of the inner volume parallel to the center plane decreases as the center wall extends toward the center plane.

Numbered Paragraph 13: The air intake system for a vehicle HVAC system of Numbered Paragraph 12, wherein a portion of the inner surface of the center wall proximate to the first side wall has a constant profile such that a cross-section of the inner volume parallel to the center plane proximate to the first side wall is constant, and a portion of the inner surface of the center wall proximate to the second side wall has a constant profile such that a cross-section of the inner volume parallel with the center plane proximate to the second side wall is constant.

Numbered Paragraph 14: The air intake system for a vehicle HVAC system of either of Numbered Paragraphs 12 or 13, wherein air that flows into the inner volume from the first air inlet through the first side wall flows across the inner surface of the center wall and is directed toward the air outlet due to the curve of the inner surface, and air that flows into the inner volume from the first air inlet through the second side wall flows across the inner surface of the center wall and is directed toward the air outlet due to the curve of the inner surface.

Numbered Paragraph 15: The air intake system for a vehicle HVAC system of any one of Numbered Paragraphs 1-14, wherein the housing supports a second valve within the second inlet, wherein the second valve may positioned to either allow air flow through the second inlet or prevent air flow through the second inlet.

Numbered Paragraph 16: The air intake system for a vehicle HVAC system of either of Numbered Paragraphs 1 or 2, wherein housing wall comprises first and second side walls, the first and second side walls are each planar or substantially planar, the first and second walls being are spaced apart, the housing wall further comprises a center wall that extends between the first and second side walls, wherein the first air inlet extends through each of the first and second side walls wherein the first air inlet further comprises a center portion that extends through the center wall, wherein the housing is disposed within the vehicle such that a rear projecting surface faces a first direction toward passenger compartment of the vehicle that receives the HVAC system, and a front projecting surface that faces in second direction that is opposite the first direction, such that the front projecting surfaces faces away from the passenger compartment, wherein the center portion of the first air inlet does not face in the first direction.

Numbered Paragraph 17: The air intake system for a vehicle HVAC system of Numbered Paragraph 16, wherein the valve comprises a second blocking surface that is aligned with the center portion of the first air inlet, wherein the second blocking surface moves with rotation of the input shaft.

Numbered Paragraph 18: The air intake system for a vehicle HVAC system of Numbered Paragraph 17, wherein the input shaft supports a first gear, wherein the first gear is meshed with a second gear that is fixed to the blocking surface.

Numbered Paragraph 19: The air intake system for a vehicle HVAC system of Numbered Paragraph 18, wherein the blocking surface includes a first blocking surface that moves across a first planar side surface of the housing wall, and a second blocking surface that moves across a second planar side surface of the housing wall, and a third blocking surface that moves across the center portion of the first air inlet, wherein the first and second planar side surfaces of the housing wall are parallel or substantially parallel to each other, wherein the input shaft supports a first pinion gear that transfers torque to the first blocking surface, and a second pinion gear that transfers torque to the second blocking surface, wherein the torque is transferred simultaneously to the first and second blocking surfaces when the input shaft rotates, and wherein the third blocking surface moves with movement of the first and second blocking surfaces.

Numbered Paragraph 20: An air intake system for a vehicle HVAC system, comprising:

a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle;

wherein the air outlet allows air from within the inner volume to flow out of the housing and to a fan disposed downstream of the air outlet;

wherein the housing is disposed within the vehicle such that a rear projecting surface faces a first direction toward passenger compartment of the vehicle that receives the HVAC system, and a front projecting surface that faces in second direction that is opposite the first direction, such that the front projecting surfaces faces away from the passenger compartment, a valve that is movable with respect to the housing, the valve can be moved between a first position where air can flow through the first air inlet and into the inner volume and a second position where air is prevented from flowing through the first air inlet and into the inner volume;

the valve includes a blocking surface, wherein the blocking surface receives torque from an input, wherein the blocking surface is movable between a first position where air is allowed to flow through the first air inlet and a second position where air is prevented from flowing through the first air inlet, wherein housing wall comprises first and second side walls, the first and second side walls are each planar or substantially planar, the first and second walls are spaced apart, the housing wall further comprises a center wall that extends between the first and second side walls, wherein the first air inlet extends through each of the first and second side walls, and a center portion that extends along the center wall, wherein the center portion of the first air inlet does not face in the first direction.

The invention claimed is:

1. An air intake system for a vehicle HVAC system, comprising:

a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle;

wherein the air outlet allows air from within the inner volume to flow out of the housing and to a fan disposed downstream of the air outlet;

a valve that is movable with respect to the housing, the valve can be moved between a first position where air can flow through the first air inlet and into the inner volume and a second position where air is prevented from flowing through the first air inlet and into the inner volume;

the valve includes a blocking surface, wherein the blocking surface receives torque from an input that is disposed radially outboard of the blocking surface, wherein the blocking surface is movable between a first position where air is allowed to flow through the first air inlet and a second position where air is prevented from flowing through the first air inlet, further comprising an operator that generates torque that is transferred to the valve, wherein the operator causes rotation of an input shaft that is located outside of the housing wall that defines the inner volume of the housing, wherein the input shaft supports a first gear, wherein the first gear is meshed with a second gear that is fixed to the blocking surface;

wherein housing wall comprises first and second side walls, the first and second side walls are each planar or substantially planar, the first and second walls being are spaced apart, the housing wall further comprises a center wall that extends between the first and second side walls, wherein the first air inlet extends through each of the first and second side walls, wherein the first air inlet does not extend through the center wall, and wherein the inner volume defines a first cavity and a second cavity and a center plane that extends through the inner volume, the center plane is parallel or substantially parallel to the first and second walls and extends such that the first and second walls are both the same distance from the center plane, wherein the first cavity extends inwardly from the first wall toward the center plane, and the second cavity extends inwardly from the second wall toward the center plane, wherein the center wall comprises an inner surface that faces the inner volume and the center plane extends through the center wall, wherein a portion of the inner surface of the center wall along the first cavity and proximate to the center plane is curved as the center wall extends from the first side wall toward the center plane such that a cross-section of the inner volume parallel to the center plane decreases as the center wall extends toward the center plane, and wherein a portion of the inner surface of the center wall along the second cavity and proximate to the center plane is curved as the center wall extends from the second side wall toward the center plane such that a cross-section of the inner volume parallel to the center plane decreases as the center wall extends toward the center plane.

2. The air intake system for a vehicle HVAC system of claim 1, wherein the first gear is a pinion gear, and the second gear is a rack gear.

3. The air intake system for a vehicle HVAC system of claim 1, wherein the blocking surface includes a first blocking surface that moves across a first planar side surface of the housing wall, and a second blocking surface that moves across a second planar side surface of the housing wall, wherein the first and second planar side surfaces of the housing wall are parallel or substantially parallel to each other.

4. The air intake system for a vehicle HVAC system of claim 3, wherein the first gear is a first pinion gear that transfers torque to the first blocking surface, and the input shaft supports a second pinion gear that transfers torque to the second blocking surface, wherein the torque is transferred simultaneously to the first and second blocking surfaces when the input shaft rotates.

5. The air intake system for a vehicle HVAC system of claim 4, wherein the first blocking surface comprises a first rack gear that is meshed with the first pinion gear and the second blocking surface comprises a second rack gear that is meshed with the second pinion gear.

6. The air intake system for a vehicle HVAC system of claim 1, wherein the second inlet extends through the center wall.

7. The air intake system for a vehicle HVAC system of claim 6, further comprising a third inlet disposed through the center wall that is configured to allow a filter to extend through the third inlet such that the filter extends within the inner volume and when properly installed the filter is disposed such that air that enters the inner volume through either the first air inlet or the second air inlet passes through the filter in order to reach the air outlet.

8. The air intake system for a vehicle HVAC system of claim 1, wherein a portion of the inner surface of the center wall proximate to the first side wall has a constant profile such that a cross-section of the inner volume parallel to the center plane proximate to the first side wall is constant, and a portion of the inner surface of the center wall proximate to the second side wall has a constant profile such that a cross-section of the inner volume parallel with the center plane proximate to the second side wall is constant.

9. The air intake system for a vehicle HVAC system of claim 1, wherein air that flows into the inner volume from the first air inlet through the first side wall flows across the inner surface of the center wall and is directed toward the air outlet due to the curve of the inner surface, and air that flows into the inner volume from the first air inlet through the second side wall flows across the inner surface of the center wall and is directed toward the air outlet due to the curve of the inner surface.

10. The air intake system for a vehicle HVAC system of claim 1, wherein the housing supports a second valve within the second inlet, wherein the second valve may be positioned to either allow air flow through the second inlet or prevent air flow through the second inlet.

11. The air intake system for a vehicle HVAC system of claim 1, wherein housing wall comprises first and second side walls, the first and second side walls are each planar or substantially planar, the first and second walls being are spaced apart, the housing wall further comprises a center wall that extends between the first and second side walls, wherein the first air inlet extends through each of the first and second side walls wherein the first air inlet further comprises a center portion that extends through the center wall, wherein the housing is disposed within the vehicle such that a rear projecting surface faces a first direction toward passenger compartment of the vehicle that receives the HVAC system, and a front projecting surface that faces in second direction that is opposite the first direction, such that the front projecting surfaces faces away from the passenger compartment, wherein the center portion of the first air inlet does not face in the first direction.

12. The air intake system for a vehicle HVAC system of claim 11, wherein the valve comprises a second blocking surface that is aligned with the center portion of the first air inlet, wherein the second blocking surface moves with rotation of the input shaft.

13. The air intake system for a vehicle HVAC system of claim 12, wherein the input shaft supports a first gear, wherein the first gear is meshed with a second gear that is fixed to the blocking surface.

14. An air intake system for a vehicle HVAC system, comprising:

a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle;

wherein the air outlet allows air from within the inner volume to flow out of the housing and to a fan disposed downstream of the air outlet;

a valve that is movable with respect to the housing, the valve can be moved between a first position where air can flow through the first air inlet and into the inner volume and a second position where air is prevented from flowing through the first air inlet and into the inner volume;

the valve includes a blocking surface, wherein the blocking surface receives torque from an input that is disposed radially outboard of the blocking surface, wherein the blocking surface is movable between a first position where air is allowed to flow through the first air inlet and a second position where air is prevented from flowing through the first air inlet, further comprising an operator that generates torque that is transferred to the valve, wherein the operator causes rotation of an input shaft that is located outside of the housing wall that defines the inner volume of the housing, wherein the input shaft supports a first gear, wherein the first gear is meshed with a second gear that is fixed to the blocking surface;

wherein the blocking surface includes a first blocking surface that moves across a first planar side surface of the housing wall, and a second blocking surface that moves across a second planar side surface of the housing wall, and a third blocking surface that moves across the center portion of the first air inlet, wherein the first and second planar side surfaces of the housing wall are parallel or substantially parallel to each other, wherein the input shaft supports a first pinion gear that transfers torque to the first blocking surface, and a second pinion gear that transfers torque to the second blocking surface, wherein the torque is transferred simultaneously to the first and second blocking surfaces when the input shaft rotates, and wherein the third blocking surface moves with movement of the first and second blocking surfaces.

15. An air intake system for a vehicle HVAC system, comprising:

a housing that includes an air inlet and an air outlet and a housing wall that defines an inner volume of the housing, the air inlet comprising a first air inlet that is aligned to allow air to flow therethrough and into the inner volume from a passenger compartment of a vehicle that includes the housing, and a second air inlet that is configured to allow air to flow into the inner volume from outside of a vehicle;

wherein the air outlet allows air from within the inner volume to flow out of the housing and to a fan disposed downstream of the air outlet;

wherein the housing is disposed within the vehicle such that a rear projecting surface faces a first direction toward passenger compartment of the vehicle that receives the HVAC system, and a front projecting surface that faces in second direction that is opposite the first direction, such that the front projecting surfaces faces away from the passenger compartment, a valve that is movable with respect to the housing, the valve can be moved between a first position where air can flow through the first air inlet and into the inner volume and a second position where air is prevented from flowing through the first air inlet and into the inner volume;

the valve includes a blocking surface, wherein the blocking surface receives torque from an input, wherein the blocking surface is movable between a first position where air is allowed to flow through the first air inlet and a second position where air is prevented from flowing through the first air inlet, wherein housing wall comprises first and second side walls, the first and second side walls are each planar or substantially planar, the first and second walls are spaced apart, the housing wall further comprises a center wall that extends between the first and second side walls, wherein the first air inlet extends through each of the first and second side walls, and a center portion that extends along the center wall, wherein the center portion of the first air inlet does not face in the first direction;

further comprising an operator that generates torque that is transferred to the valve, wherein the operator causes rotation of an input shaft that is located outside of the housing wall that defines the inner volume of the housing, wherein the input shaft supports a first gear, wherein the first gear is meshed with a second gear that is fixed to the blocking surface;

wherein housing wall comprises first and second side walls, the first and second side walls are each planar or substantially planar, the first and second walls being are spaced apart, the housing wall further comprises a center wall that extends between the first and second side walls, wherein the first air inlet extends through each of the first and second side walls, wherein the first air inlet does not extend through the center wall, and wherein the inner volume defines a first cavity and a second cavity and a center plane that extends through the inner volume, the center plane is parallel or substantially parallel to the first and second walls and extends such that the first and second walls are both the same distance from the center plane, wherein the first cavity extends inwardly from the first wall toward the center plane, and the second cavity extends inwardly from the second wall toward the center plane, wherein the center wall comprises an inner surface that faces the inner volume and the center plane extends through the center wall, wherein a portion of the inner surface of the center wall along the first cavity and proximate to the center plane is curved as the center wall extends from the first side wall toward the center plane such that a cross-section of the inner volume parallel to the center plane decreases as the center wall extends toward the center plane, and wherein a portion of the inner surface of the center wall along the second cavity and proximate to the center plane is curved as the center wall extends from the second side wall toward the center plane such that a cross-section of the inner volume parallel to the center plane decreases as the center wall extends toward the center plane.

16. The air intake system for a vehicle HVAC system of claim 15, wherein the first gear is a pinion gear, and the second gear is a rack gear.

17. The air intake system for a vehicle HVAC system of claim 15, wherein the blocking surface includes a first blocking surface that moves across a first planar side surface of the housing wall, and a second blocking surface that moves across a second planar side surface of the housing wall, wherein the first and second planar side surfaces of the housing wall are parallel or substantially parallel to each other.

18. The air intake system for a vehicle HVAC system of claim 17, wherein the first gear is a first pinion gear that transfers torque to the first blocking surface, and the input shaft supports a second pinion gear that transfers torque to the second blocking surface, wherein the torque is transferred simultaneously to the first and second blocking surfaces when the input shaft rotates.

19. The air intake system for a vehicle HVAC system of claim 18, wherein the first blocking surface comprises a first rack gear that is meshed with the first pinion gear and the second blocking surface comprises a second rack gear that is meshed with the second pinion gear.

* * * * *